United States Patent
Iino

(10) Patent No.: US 8,259,232 B2
(45) Date of Patent: Sep. 4, 2012

(54) IMAGE DISPLAY APPARATUS AND IMAGE DISPLAY METHOD

(75) Inventor: Satoshi Iino, Kanagawa (JP)

(73) Assignee: Sony Corporation (JP)

( * ) Notice: Subject to any disclaimer, the term of this patent is extended or adjusted under 35 U.S.C. 154(b) by 421 days.

(21) Appl. No.: 12/586,214

(22) Filed: Sep. 18, 2009

(65) Prior Publication Data

US 2010/0073564 A1     Mar. 25, 2010

(30) Foreign Application Priority Data

Sep. 22, 2008   (JP) ................ P2008-243048

(51) Int. Cl.
*H04N 7/00*     (2006.01)
*H04N 5/445*    (2006.01)
*H04N 9/64*     (2006.01)
*H04N 9/74*     (2006.01)
*H04N 9/76*     (2006.01)

(52) U.S. Cl. ........ 348/564; 348/474; 348/575; 348/589; 348/600

(58) Field of Classification Search .......... 348/473, 348/474, 563, 564, 561, 575, 576, 580, 581, 348/584, 590, 598, 600, 634, 734
See application file for complete search history.

(56) References Cited

U.S. PATENT DOCUMENTS

| | | | | |
|---|---|---|---|---|
| 5,377,314 A * | 12/1994 | Bates et al. | ................. | 345/634 |
| 5,589,893 A * | 12/1996 | Gaughan et al. | ............... | 725/37 |
| 5,708,475 A | 1/1998 | Hayashi et al. | | |
| 5,943,053 A * | 8/1999 | Ludolph et al. | ............... | 715/790 |
| 6,008,802 A * | 12/1999 | Iki et al. | ...................... | 715/721 |
| 6,018,372 A * | 1/2000 | Etheredge | ...................... | 725/44 |
| 6,025,841 A * | 2/2000 | Finkelstein et al. | .......... | 715/803 |
| 6,141,003 A * | 10/2000 | Chor et al. | .................... | 715/719 |
| 6,181,335 B1 * | 1/2001 | Hendricks et al. | ............ | 715/723 |
| 6,201,879 B1 * | 3/2001 | Bender et al. | ................. | 382/100 |
| 6,473,102 B1 * | 10/2002 | Rodden et al. | ................ | 715/788 |
| 6,621,939 B1 * | 9/2003 | Negishi et al. | ................ | 382/291 |
| 6,678,009 B2 * | 1/2004 | Kahn | ............................ | 348/569 |
| 6,865,719 B1 * | 3/2005 | Nicholas, III | ................. | 715/856 |
| 6,907,576 B2 * | 6/2005 | Barbanson et al. | ........... | 715/791 |
| 7,006,151 B2 * | 2/2006 | Dieterich | ....................... | 348/565 |
| 7,020,336 B2 * | 3/2006 | Cohen-Solal et al. | ......... | 382/204 |
| 7,034,851 B1 * | 4/2006 | Furui et al. | .................... | 345/660 |
| 7,073,187 B1 * | 7/2006 | Hendricks et al. | .............. | 725/36 |
| 7,095,450 B1 * | 8/2006 | Holmes et al. | ................ | 348/586 |
| 7,119,848 B2 * | 10/2006 | Smith et al. | ................... | 348/564 |
| 7,206,029 B2 * | 4/2007 | Cohen-Solal | ................. | 348/565 |
| 7,353,459 B2 * | 4/2008 | Barbanson et al. | ........... | 715/791 |
| 7,412,654 B1 * | 8/2008 | Cappels et al. | ............... | 715/726 |
| 7,477,322 B2 * | 1/2009 | Hsieh | ............................ | 348/569 |

(Continued)

FOREIGN PATENT DOCUMENTS

JP     08-322000 A     12/1996

(Continued)

*Primary Examiner* — Brian Yenke
(74) *Attorney, Agent, or Firm* — Lerner, David, Littenberg, Krumholz & Mentlik, LLP

(57) ABSTRACT

An image display apparatus including an image receiving unit that receives an image signal on which additional display information is superimposed, an image display unit that displays the image signal on which the additional display information is superimposed in a screen, and an information display unit that displays predetermined display information at a display position of the additional display information so that the additional display information displayed in the screen is hidden.

6 Claims, 23 Drawing Sheets

U.S. PATENT DOCUMENTS

| | | | |
|---|---|---|---|
| 7,595,840 B2 * | 9/2009 | Hsieh | 348/569 |
| 7,599,558 B2 * | 10/2009 | Yeh et al. | 382/181 |
| 7,629,971 B2 * | 12/2009 | Plut | 345/211 |
| 7,672,539 B2 * | 3/2010 | Wang | 382/284 |
| 7,739,619 B2 * | 6/2010 | Sekiguchi et al. | 715/794 |
| 8,037,423 B2 * | 10/2011 | Peterson et al. | 715/835 |
| 8,060,905 B1 * | 11/2011 | Hendricks | 725/41 |
| 2002/0070957 A1 * | 6/2002 | Trajkovic et al. | 345/719 |
| 2003/0091237 A1 * | 5/2003 | Cohen-Solal et al. | 382/204 |
| 2003/0233425 A1 * | 12/2003 | Lyons et al. | 709/217 |
| 2004/0107438 A1 * | 6/2004 | Sekiguchi et al. | 725/43 |
| 2005/0078222 A1 * | 4/2005 | Liu et al. | 348/700 |
| 2005/0078223 A1 * | 4/2005 | Liu et al. | 348/701 |
| 2008/0184112 A1 * | 7/2008 | Chiang et al. | 715/700 |
| 2009/0119379 A1 * | 5/2009 | Read et al. | 709/206 |
| 2009/0305680 A1 * | 12/2009 | Swift et al. | 455/414.1 |
| 2010/0001992 A1 * | 1/2010 | Schultz et al. | 345/419 |

FOREIGN PATENT DOCUMENTS

JP  10-042214 A  2/1998

* cited by examiner

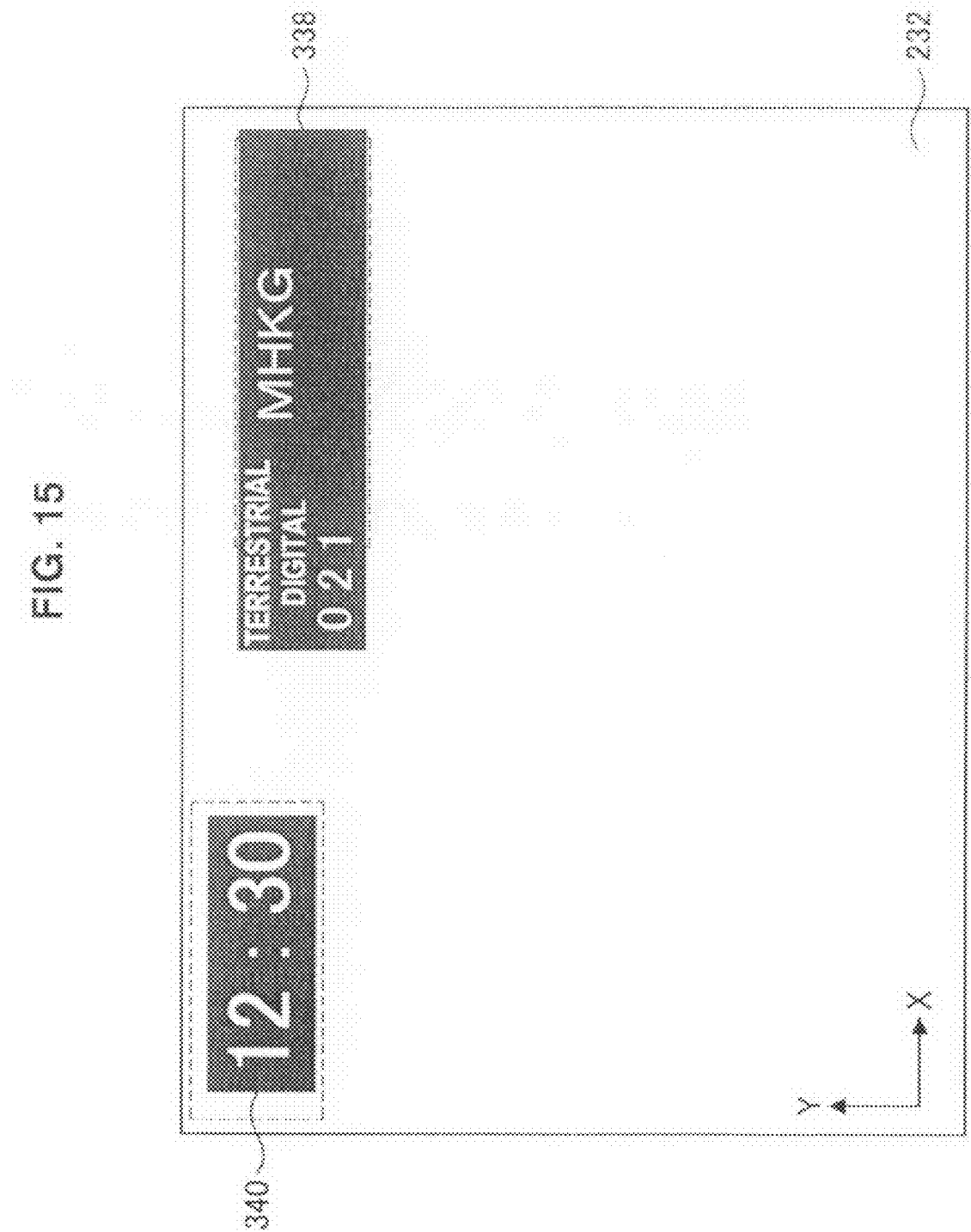

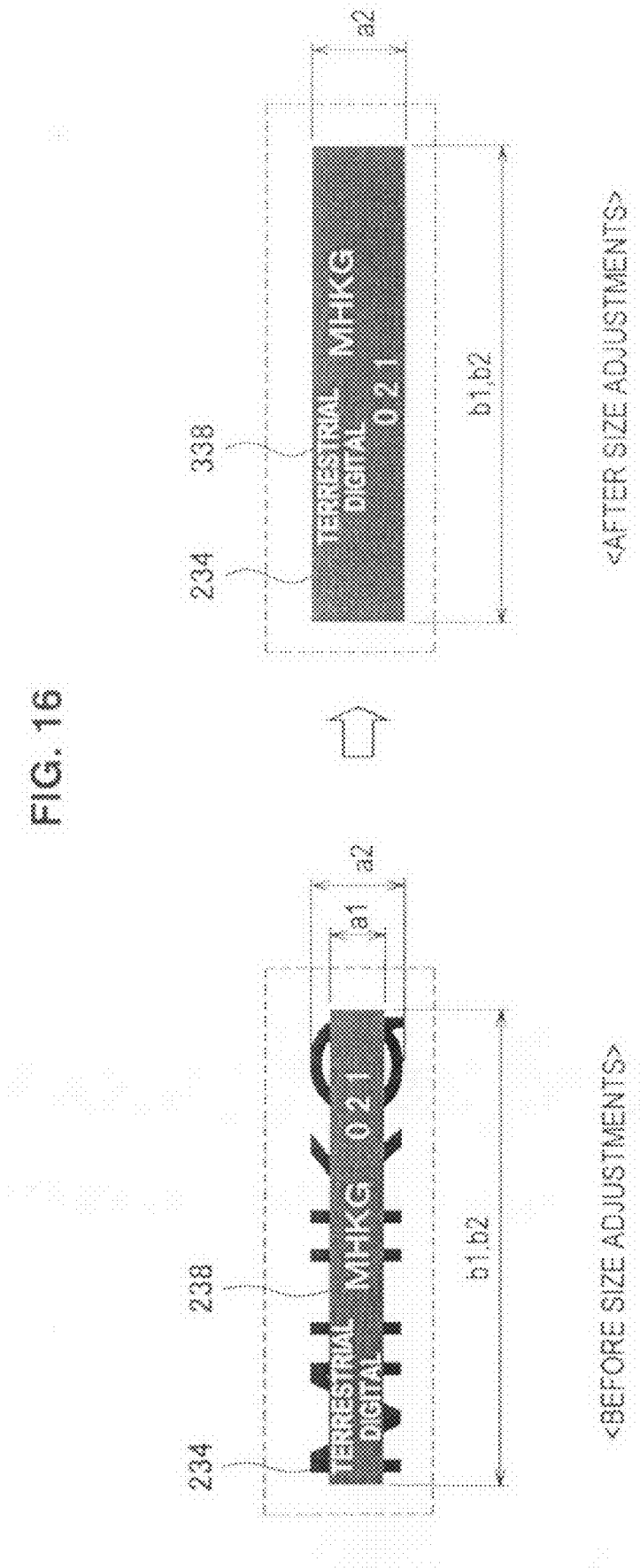

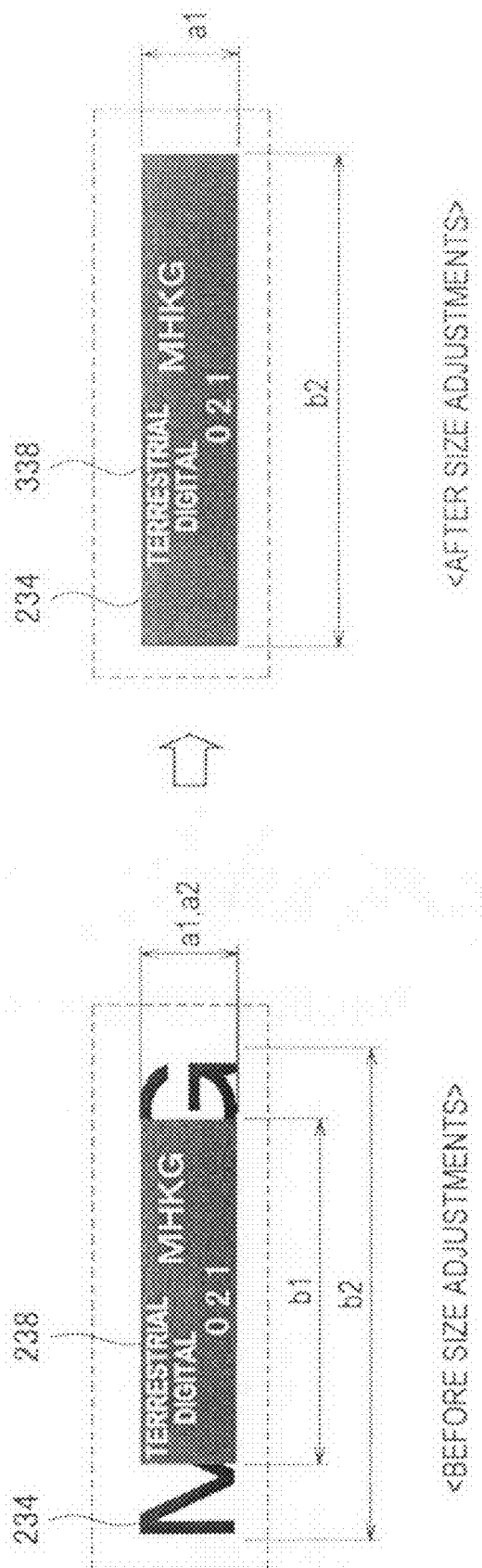

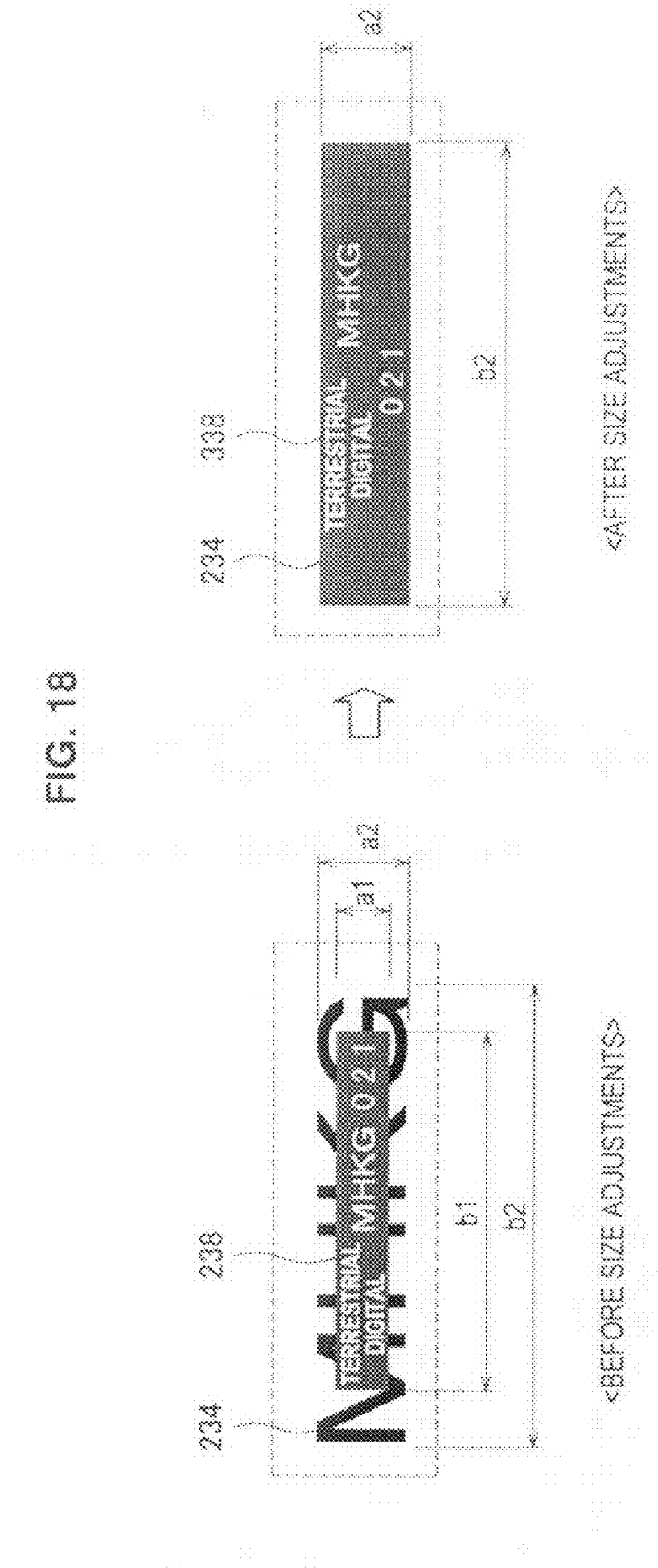

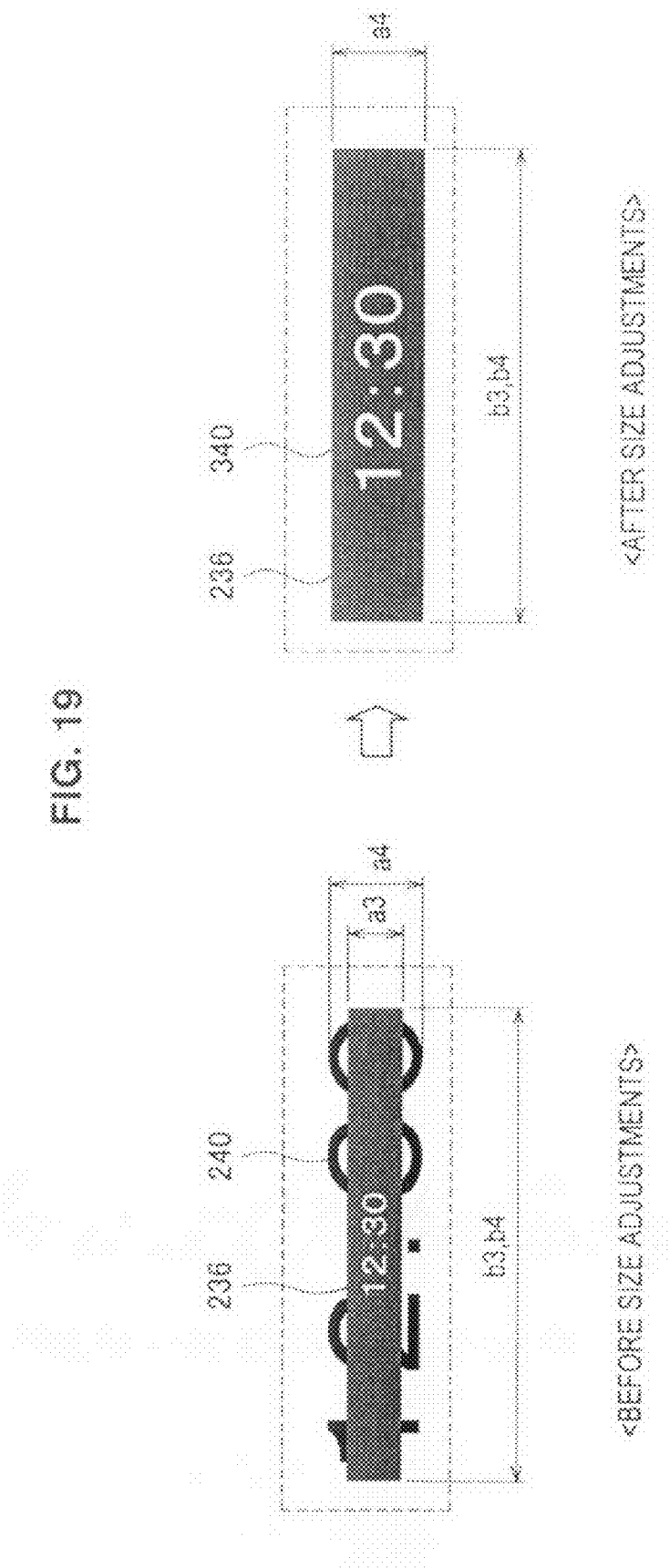

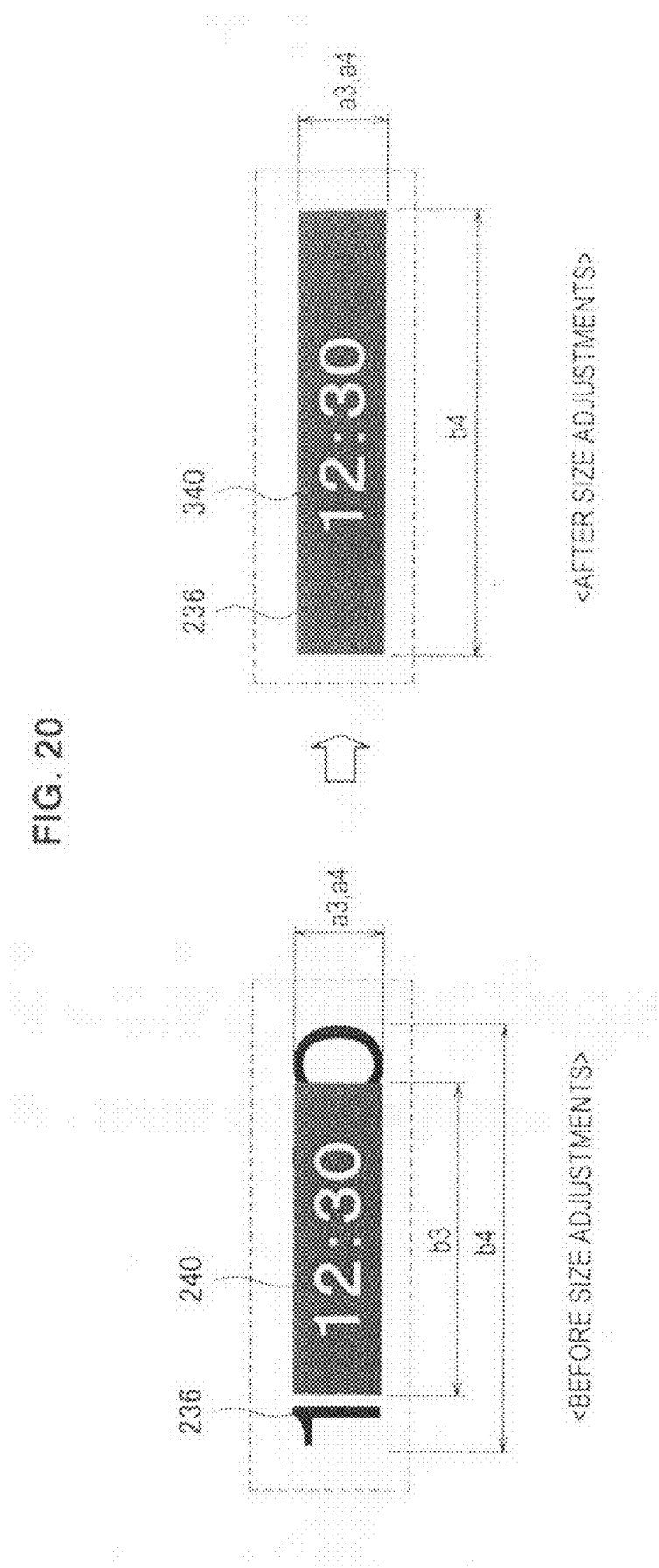

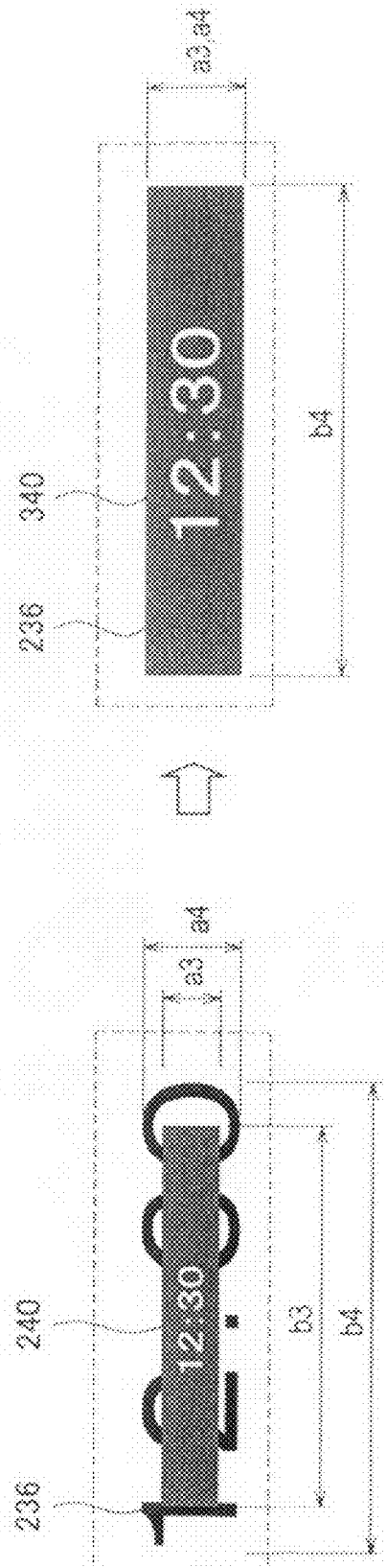

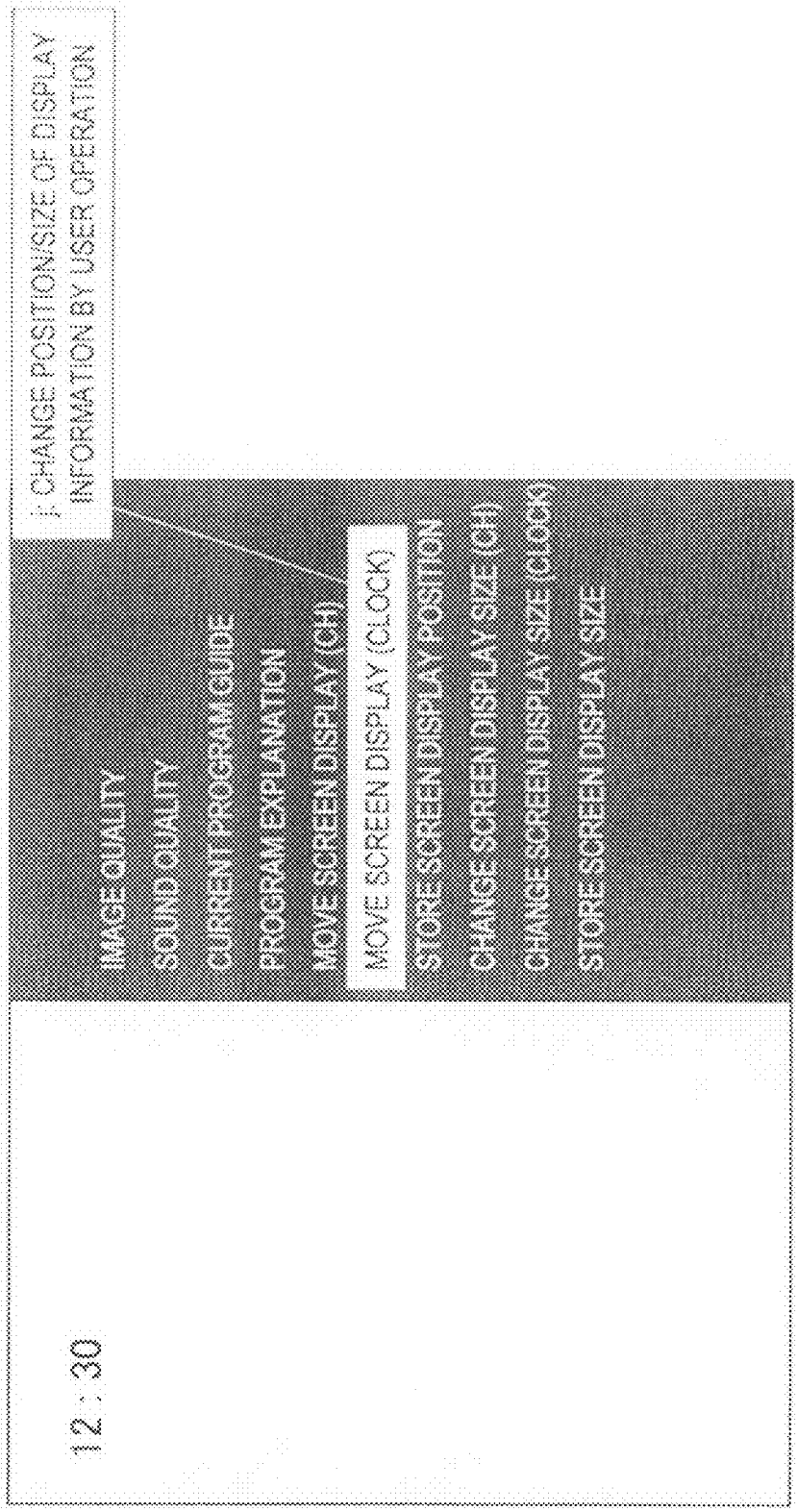

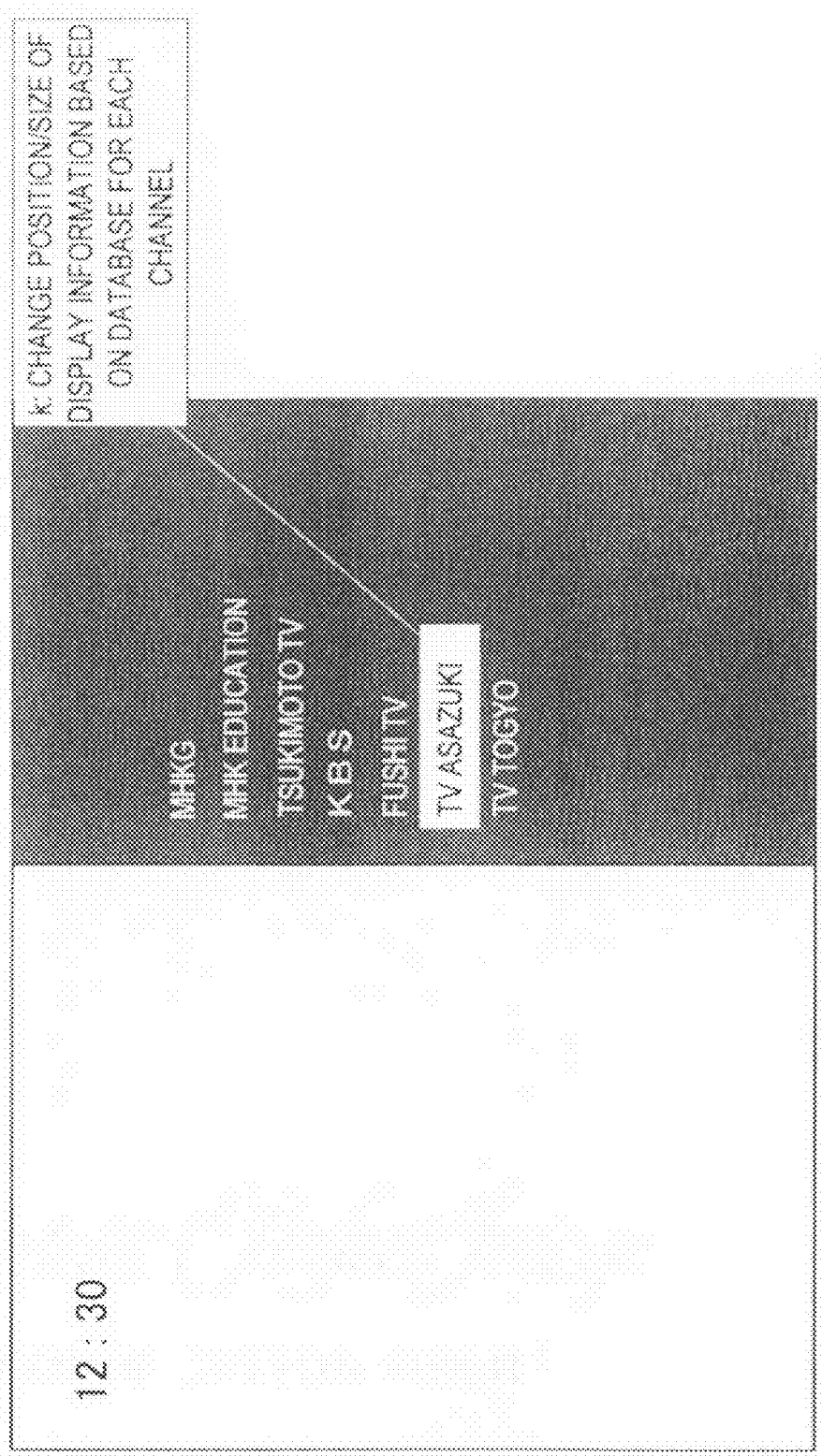

IMAGE DISPLAY APPARATUS AND IMAGE DISPLAY METHOD

CROSS-REFERENCE TO RELATED APPLICATION

The present application claims priority from Japanese Patent Application No. JP 2008-243048 filed in the Japanese Patent Office on Sep. 22, 2008, the entire content of which is incorporated herein by reference.

BACKGROUND OF THE INVENTION

1. Field of the Invention

The present invention relates to an image display apparatus and an image display method.

2. Description of the Related Art

In recent years, image display apparatuses such as TV sets have become multifunctional. Thus, a user can obtain various kinds of information by using various functions provided with such an image display apparatus. With increasing functions, on the other hand, operations of such functions become increasingly complicated and user convenience will decrease. Thus, while it is necessary to develop new technologies from the viewpoint of multifunctionality, it is also necessary to devise new ideas or ways to enhance convenience for the use. Functions provided with an image display apparatus include a function to display display information such as channel logos of broadcasting stations, time information, and channel numbers in a screen. Regarding such a function, for example, Japanese Patent Application Laid-Open No. 10-42214 discloses a technology to display information related to the broadcasting program being displayed in the screen.

On the other hand, broadcasting stations may deliver additional display information such as channel logos of local stations, time information, and channel numbers by superimposing such additional display information on image signals. Regarding such a delivery technology, for example, Japanese Patent Application Laid-Open No. 08-322000 discloses a technology to deliver additional information by superimposing the additional display information on an image signal. Additional display information delivered by being superimposed on image signals by broadcasting stations is information provided independently such as channel logos individually displayed by image display apparatuses.

SUMMARY OF THE INVENTION

Thus, when broadcasting stations transmit additional display information as described above by superimposing the additional display information on image signals, information of the same content is to be displayed if image display apparatuses individually display display information such as channel logos. Since information displayed duplicately in the screen has the same content, extra information displayed in the screen makes the screen display more complicated. As a result, the user is made uncomfortable.

The present invention has been made in view of the above issue and it is desirable to provide a novel and improved image display apparatus capable of preventing information of the same content from being displayed in the screen by masking display content of information delivered by being superimposed on an image signal depending on display information displayed by an image display apparatus and an image display method.

According to an embodiment of the present invention, there is provided an image display apparatus including: an image receiving unit that receives an image signal on which additional display information is superimposed; an image display unit that displays the image signal on which the additional display information is superimposed in a screen; and an information display unit that displays predetermined display information at a display position of the additional display information so that the additional display information displayed in the screen is hidden.

The image display apparatus may further include a display position recording unit that records display position information indicating a display position of the additional display information for each channel. In this case, if the display position information is recorded by the display position recording unit, the information display unit displays the predetermined display information based on the display position information.

The image display apparatus may be configured such that the information display unit adjusts a display size of the predetermined display information so that the additional display information displayed in the screen is hidden. In this case, the display position recording unit records display size information indicating the display size of the predetermined display information together with the display position information. Furthermore, if the display position information and the display size information are recorded by the display position recording unit, the information display unit displays the predetermined display information based on the display position information and the display size information.

The image display apparatus may further include a display position detection unit that detects the display position of the additional display information displayed in the screen. In this case, the information display unit displays the predetermined display information at the display position detected by the display position detection unit so that the additional display information displayed in the screen is hidden.

The image display apparatus may be configured such that the information display unit displays the predetermined display information containing a same content as the additional display information at the display position detected by the display position detection unit.

The image display apparatus may be configured such that the image receiving unit receives the image signal on which at least one piece of information of channel information of a program corresponding to the image signal, title information of the program, and time information as the additional display information is superimposed.

According to another embodiment of the present invention, there is provided an image display method including the steps of: receiving an image signal on which additional display information is superimposed; displaying the image signal on which the additional display information is superimposed in a screen; and displaying predetermined display information at a display position of the additional display information so that the additional display information displayed in the screen is hidden.

According to another embodiment of the present invention, there is provided a program to cause a computer to realize the functions held by the above image display apparatus. Further, a computer readable recording medium in which the program is recorded can be provided.

According to the embodiments of the present invention described above, information of the same content can be prevented from being displayed in the screen by masking display content of information delivered by being superimposed on an image signal depending on display information displayed by an image display apparatus. As a result, complicatedness of the screen display is cleared away so that discomfort of the user caused by duplicate displays can be removed.

BRIEF DESCRIPTION OF THE DRAWINGS

FIG. 15 is an explanatory view showing that the screen display OSD of the image display apparatus according to the embodiment hides additional display information;

FIG. 16 is an explanatory view showing that the screen display OSD of the image display apparatus according to the embodiment changes in size in the screen;

FIG. 17 is an explanatory view showing that the screen display OSD of the image display apparatus according to the embodiment changes in size in the screen;

FIG. 18 is an explanatory view showing that the screen display OSD of the image display apparatus according to the embodiment changes in size in the screen;

FIG. 19 is an explanatory view showing that the screen display OSD of the image display apparatus according to the embodiment changes in size in the screen;

FIG. 20 is an explanatory view showing that the screen display OSD of the image display apparatus according to the embodiment changes in size in the screen;

FIG. 21 is an explanatory view showing that the screen display OSD of the image display apparatus according to the embodiment changes in size in the screen;

FIG. 22 is an explanatory view showing a means used by the screen display OSD of the image display apparatus according to the embodiment to move or change in size; and FIG. 23 is an explanatory view showing a means used by the screen display OSD of the image display apparatus according to the embodiment to move or change in size.

DETAILED DESCRIPTION OF THE PREFERRED EMBODIMENTS

Figure 1:
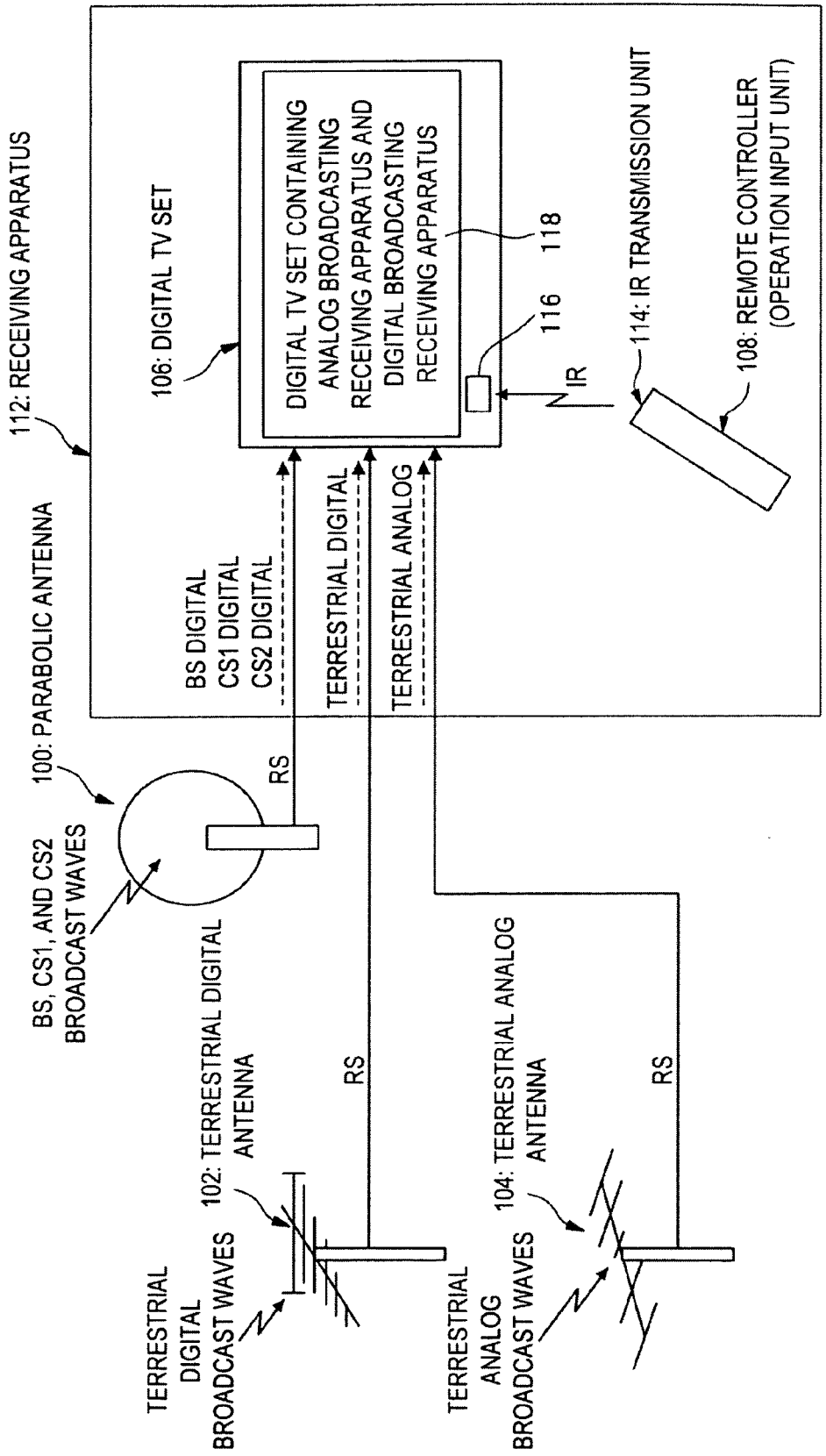
FIG. 1 is an explanatory view showing a configuration example of an electronic device system to which technology according to an embodiment of the present invention is applicable.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of the Description]

First, a system configuration example of an electronic device system to which technology according to an embodiment of the present invention is applicable will be described with reference to FIG. 1. Next, a key configuration example of a remote controller contained in the electronic device system will be described with reference to FIG. 2. Next, a hardware configuration example capable of realizing a function of a digital TV set according to the embodiment will be described with reference to FIG. 3.

Next, a function configuration of an image display apparatus according to an embodiment of the present invention and an image display method will be described with reference to FIG. 4 to FIG. 9. Next, another image display method according to the embodiment will be described with reference to FIG. 10 to FIG. 18. Further, still another image display method according to the embodiment will be described with reference to FIG. 19 and FIG. 20. Lastly, technical ideas of the embodiment will be summarized and operation effects obtained from the technical ideas will be briefly described.

[Configuration of the Electronic Device System]

First, the system configuration of an electronic device system 110 according to an embodiment of the present invention will be described with reference to FIG. 1. FIG. 1 is an explanatory view showing a configuration example of the electronic device system 110 according to the embodiment.

As shown in FIG. 1, the electronic device system 110 mainly includes a parabolic antenna 100, a terrestrial digital antenna 102, a terrestrial analog antenna 104, and a digital TV set 106.

The digital TV set 106 illustrated in FIG. 1 is equipped with an analog broadcasting reception function and a digital broadcasting reception function. Further, the digital TV set 106 is equipped with an automatic channel setting function and a message display function of terrestrial digital broadcasting. Moreover, the digital TV set 106 is provided with a remote controller 108 as an operation means. Further, the digital TV set 106 is provided with an infrared receiving unit 116 to receive an infrared signal IR emitted from the remote controller 108. Incidentally, the digital TV set 106 and the remote controller 108 may be called a TV broadcasting receiving apparatus 112 together.

The electronic device system 110 constitutes a terrestrial broadcasting system and a digital satellite broadcasting system. For example, a received signal RS received by the parabolic antenna 100 is input into the digital TV set 106. Similarly, a received signal RS received by the terrestrial digital antenna 102 and a received signal RS received by the terrestrial analog antenna 104 are input into the digital TV set 106. In this manner, various broadcast signals of terrestrial analog broadcasting, terrestrial digital broadcasting, satellite broadcasting and the like are input into the digital TV set 106. Moreover, the digital TV set 106 may be provided with input terminals to connect to a reproducing device, recording/reproducing device and the like.

On the other hand, the remote controller 108 is provided with an IR transmission unit 114 (remote controller signal transmission unit 1000) to emit an infrared (IR) signal. For example, the remote controller 108 emits an infrared signal in accordance with a user's operation to give various directions to the digital TV set 106. That is, the remote controller 108 is a user's operation input means and also a control means of the digital TV set 106. User's Operations are mostly performed by using operations keys provided in the remote controller 108.

Figure 2:
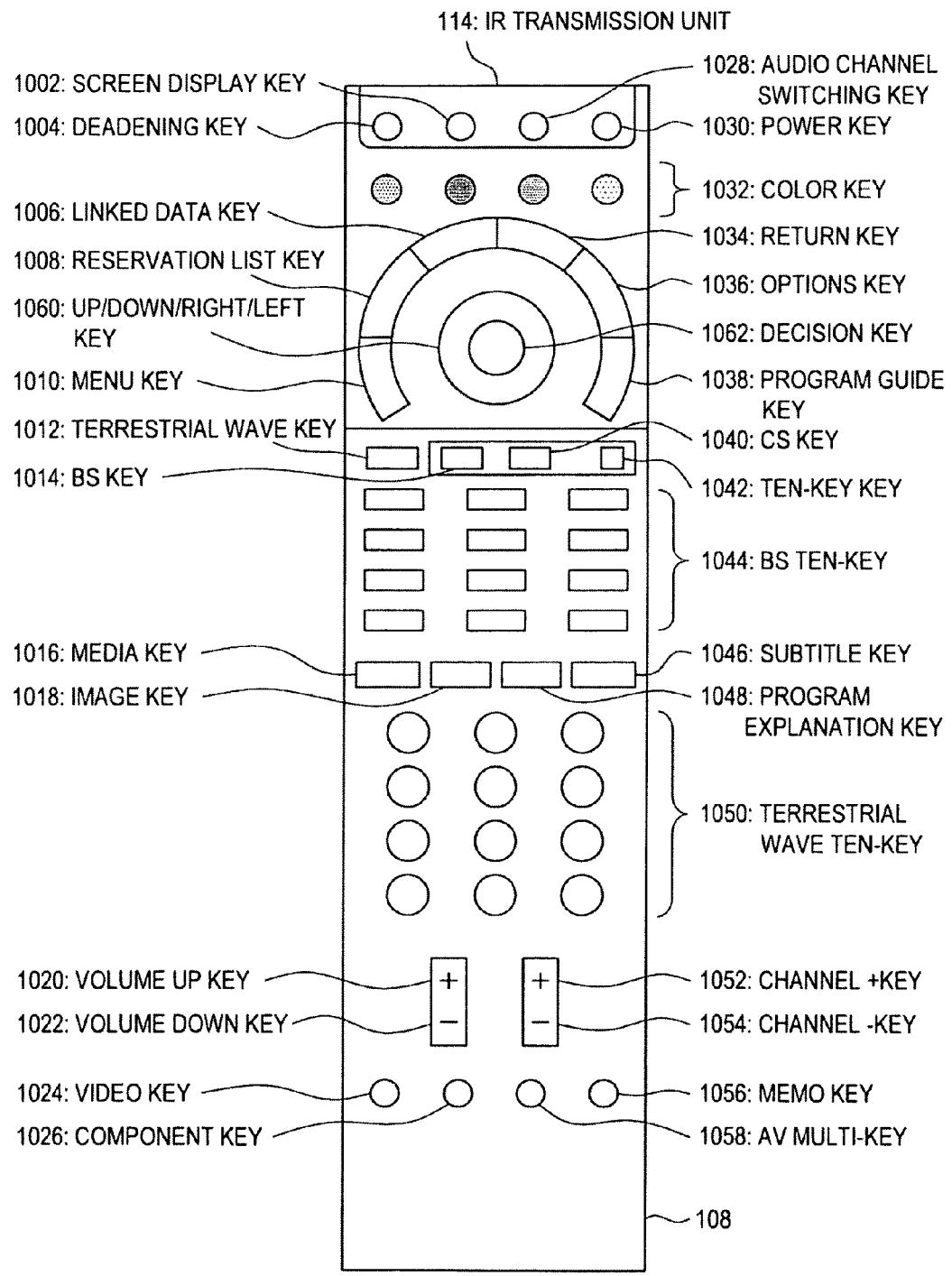
FIG. 2 is an explanatory view exemplifying a remote controller, which is a portion of the electronic device system to which the technology according to the embodiment is applicable.

Here, the key configuration of the remote controller 108 will be described with reference to FIG. 2. FIG. 2 is an explanatory view showing a key configuration example of the remote controller 108. However, FIG. 2 shows only main keys used for input operation according to the embodiment.

As shown in FIG. 2, the remote controller 108 includes a screen display key, 1002, a deadening key 1004, a linked data key 1006, a reservation list key 1008, and a menu key 1010. The remote controller 108 also includes a terrestrial wave key 1012, a BS key 1014, a media key 1016, an image key 1018, a volume up key 1020, a volume down key 1022, a video key 1024, and a component key 1026.

Further, the remote controller 108 includes an audio channel switching key 1028, a power key 1030, a color key 1032, a return key 1034, an options key 1036, a program guide key 1038, a CS key 1040, a ten-key key 1042, and a BS ten-key 1044. Also, the remote controller 108 includes a subtitle key 1046, a program explanation key 1048, a terrestrial wave ten-key 1050, a channel +key 1052, a channel −key 1054, a memo key 1056, an AV multi-key 1058, an up/down/right/left key 1060, and a decision key 1062.

[Configuration of Keys of the Remote Controller]

The screen display key 1002 is used to switch the input system of an image signal input from a plurality of input terminals provided in the digital TV set 106. The deadening key 1004 is operated to turn on or off the mute of audio output from a speaker provided in the digital TV set 106. The power key 1030 is operated when the digital TV set 106 is turned on or off. The audio channel switching key 1028 is operated to switch the audio type (for example, the main audio channel and sub audio channel) of audio output from the speaker provided in the digital TV set 106.

The color key 1032 is operated when various selections are made following guidance of the screen displayed in the digital TV set 106.

The menu key 1010 is operated when various menus such as the display of short-cut menus displayed in the digital TV set 106 are used. The linked data key 1006 is operated when the graphic display such as an OSD (On Screen Display) superimposed on an image signal is turned, on or off. The reservation list key 1008 is operated when the screen is switched to the display screen of a list of BS digital broadcasting, CS digital broadcasting, and terrestrial digital broadcasting recorded by a digital tuner provided in the digital TV set 106. The return key 1034 is used to return to the channel of a program displayed immediately before the channel of the program currently displayed in a screen 118 of the digital TV set 106. The options key 1036 is operated when digital TV set 106 is caused to display the menu of various options such as the brightness and contrast of an image signal. The program guide key 1038 is operated when the display of a program guide based on EPG information is turned on or off.

The circular up/down/right/left key 1060 is used to move the cursor up and down, left and right in the screen 118 of the digital TV set 106. The up/down/right/left key is also operated when the screen displayed OSD described below is moved up and down, left and right in the screen 118. The decision key 1062 is operated when a selection item in the screen 118 of the digital TV set 106 is determined.

The terrestrial wave key 1012 is operated when the digital TV set 106 is caused to display terrestrial analog broadcasting or terrestrial digital broadcasting. The BS key 1014 is operated when the screen is switched to BS digital broadcasting in the digital TV set 106. The CS key 1040 is operated when the screen is switched to CS digital broadcasting in the digital TV set 106. The ten-key key 1042 is used to input the channel number in the ten place of the channel of broadcasting the digital TV set 106 is caused to display. The BS ten-key 1044 is operated when the channel is selected while BS digital broadcasting or CS digital broadcasting the digital TV set 106 is caused to display is viewed.

The media key 1016 is operated when terrestrial analog broadcasting, terrestrial digital broadcasting, BS digital broadcasting, and CS digital broadcasting are switched in turn in the digital TV set 106. The image key 1018 is operated when the image should be switched while a program in which two or more images are simultaneously delivered is viewed in the digital TV set 106. The subtitle key 1046 is operated when the display of subtitle displayed in the screen 118 of the digital TV set 106 is turned on or off. The program explanation key 1048 is operated when the display of a program explanation displayed in the screen 118 of the digital TV set 106 is turned on or off.

The terrestrial wave ten-key 1050 is operated to switch the channel when the user views terrestrial analog broadcasting or terrestrial digital broadcasting in the digital TV set 106.

The volume up key 1020 is operated when the volume of audio output from the speaker provided in the digital TV set 106 is raised. The volume down key 1022 is operated when the volume of audio output from the speaker provided in the digital TV set 106 is lowered. The channel +key 1052 is operated to switch the channel of program viewed by the user in the digital TV set 106 in ascending order. The channel −key 1054 is operated to switch the channel of program viewed by the user in the digital TV set 106 in descending order.

The video key 1024, the component key 1026, and the AV multi-key 1058 are operated when the digital TV set 106 is caused to display images input from image devices connected to various external terminals provided in the digital TV set 106. The memo key 1056 is operated when the frame of an image signal displayed in the digital TV set 106 is stopped to cause the digital TV set 106 to display the frame as a still image.

As described above, the remote controller 108 has operation keys for performing various operations provided thereon. When one of these operation keys is pressed by the user, an infrared signal IR corresponding to the operation key is emitted from an IR transmission unit 114. Then, the infrared signal IR emitted from the remote controller 108 is received by the infrared receiving unit 116 provided in the digital TV set 106. For example, the digital TV set 106 switches an image signal displayed in the screen 118 in accordance with the infrared signal IR received by the remote controller 108.

Thus, when the remote controller 108 is operated by the user, the digital TV set 106 is controlled via the infrared signal IR.

[Hardware Configuration (Image Display Apparatus)]

Figure 3:
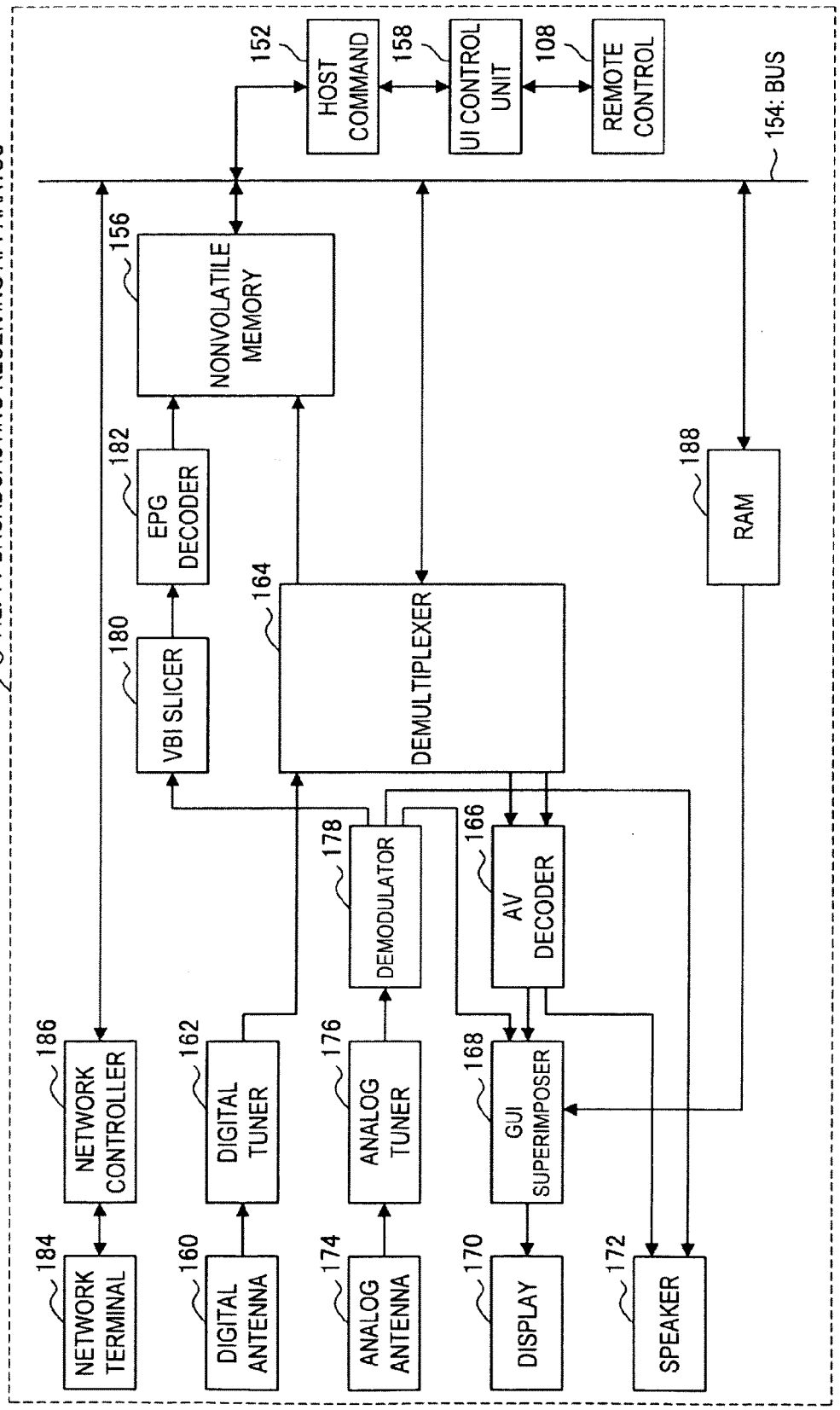
FIG. 3 is a diagram showing a hardware configuration example of an image display apparatus according to the embodiment.

Functions held by the above TV broadcasting receiving apparatus 112 can be realized by the TV broadcasting receiving apparatus 112 having the hardware configuration shown in FIG. 3. FIG. 3 is an explanatory view showing the hardware configuration of the above TV broadcasting receiving apparatus 112.

As shown in FIG. 3, the TV broadcasting receiving apparatus 112 mainly includes a host microcomputer 152, a bus 154, a nonvolatile memory 156, and a UI (User Interface) control unit 158. Further, the TV broadcasting receiving apparatus 112 includes a digital antenna 160, a digital tuner 162, a demultiplexer 164, an AV decoder 166, a GUI superimposer 168, a display 170, and a speaker 172.

Further, the TV broadcasting receiving apparatus 112 includes an analog antenna 174, an analog tuner 176, a demodulator 178, a VBI slicer 180, and an EPG decoder 182. Further, the TV broadcasting receiving apparatus 112 includes a network terminal 184, a network controller 186, and a RAM (Random Access Memory) 188.

The TV broadcasting receiving apparatus 112 has the reception/reproduction function of digital and analog TV broadcasting and the acquisition function of EPG information. The host microcomputer 152 performs various kinds of processing according to programs recorded in a built-in memory (not shown) or the nonvolatile memory 156 via the bus 154. The TV broadcasting receiving apparatus 112 also receives an operation signal input from the remote controller (hereinafter, referred to also as a remocon) RM via the UI (User Interface) control unit 158 as a command. Then, the operation of each unit is controlled in accordance with the command.

(When a Digital Broadcast Signal is Received)

The TV broadcasting receiving apparatus 112 inputs a digital broadcast signal received via the digital antenna 160 into the digital tuner 162 under the control of the host microcomputer 152. The digital tuner 162 extracts a broadcast signal of a predetermined channel from the digital broadcast signal under the control of the host microcomputer 152. The predetermined channel is, for example, a channel specified by a user's operation. Further, the TV broadcasting receiving apparatus 112 performs demodulation processing, scramble processing and the like on the extracted broadcasting channel signal. Broadcasting channel data is obtained by the demodulation processing and scramble processing. The broadcasting channel data is input into the demultiplexer 164.

The demultiplexer 164 demultiplexes image data and audio data from the broadcasting channel data and sends the image data and audio data to the AV decoder 166. The AV decoder 166 decodes the image data to generate an image signal and the audio data to generate an audio signal. The image signal generated by the AV decoder 166 is sent to the display 170 via the GUI (Graphical User Interface) superimposer 168. On the other hand, the audio signal generated by the AV decoder 166 is sent to the speaker 172. The GUI superimposer 168 superimposes a graphic signal such as the OSD (On Screen Display) on an image signal.

When the image signal is sent to the display 170 in this manner, a program image of digital broadcasting is output by the display 170. On the other hand, a program audio is output by the speaker 172. As described above, when digital broadcasting is received, the TV broadcasting receiving apparatus 112 reproduces an image signal and an audio signal of a program from a received signal and outputs the image signal and the audio signal to the display 170 and the speaker 172 respectively.

(When an Analog Broadcast Signal is Received)

The TV broadcasting receiving apparatus 112 inputs also an analog broadcast signal received via the analog antenna 174 into the analog tuner 176 under the control of the host microcomputer 152. The analog tuner 176 extracts a broadcast signal of a predetermined channel from the analog broadcast signal under the control of the host microcomputer 152. The predetermined channel is, for example, a channel specified by a user's operation. The analog tuner 176 sends the extracted broadcast signal to the demodulator 178. The demodulator 178 obtains a demodulation signal by performing predetermined demodulation processing on the broadcast signal. Further, the demodulator 178 demultiplexes an image signal and an audio signal from the demodulation signal. The image signal demultiplexed by the demodulator 178 is sent to the display 170 via the GUI superimposer 168. On the other hand, the audio signal demultiplexed by the demodulator 178 is sent to the speaker 172. The GUI superimposer 168 superimposes a graphic signal such as the OSD on an image signal.

When the image signal is sent to the display 170 in this manner, a program image of analog broadcasting is output by the display 170. On the other hand, a program audio is output by the speaker 172. As described above, when analog broadcasting is received, the TV broadcasting receiving apparatus 112 reproduces an image signal and an audio signal of a program from a received signal and outputs the image signal and the audio signal to the display 170 and the speaker 172 respectively.

(Extraction Processing and Recording Processing of EPG Information: Digital Broadcasting)

Further, the TV broadcasting receiving apparatus 112 demultiplexes EPG information of digital broadcasting from broadcasting channel data by the demultiplexer 164 under the control of the host microcomputer 152 and records the EPG information in the nonvolatile memory 156. If the EPG information is provided for each channel, the host microcomputer 152 acquires EPG information from broadcasting channel data of each of a plurality of receivable channels and records the EPG information in the nonvolatile memory 156.

(Extraction Processing and Recording Processing of EPG Information: Analog Broadcasting)

Further, the TV broadcasting receiving apparatus 112 sends a demodulation signal demodulated by the demodulator 178 to the VBI (Vertical Blanking Interval) slicer 180 under the control of the host microcomputer 152. The VBI slicer 180 cuts out a specific line of the demodulation signal and sends the specific line to the EPG decoder 182. The EPG decoder 182 acquires EPG information of analog broadcasting by decoding the specific line of the demodulation signal and records the EPG information in the nonvolatile memory 156.

The TV broadcasting receiving apparatus 112 also receives EPG information of analog broadcasting transmitted from an EPG information delivery server (not shown) under the control of the host microcomputer 152. The received EPG information is recorded in the nonvolatile memory 156 via the network controller 186 and the bus 154.

In this manner, the TV broadcasting receiving apparatus 112 acquires EPG information. EPG information contains program information about programs to be broadcast. The program information includes, for example, the broadcasting station name, channel number, broadcasting date/time, broadcasting start time, broadcasting end time, program name, genre, program outline, program details, and performers.

[Function Configuration of an Image Display Apparatus 500]

Figure 4:
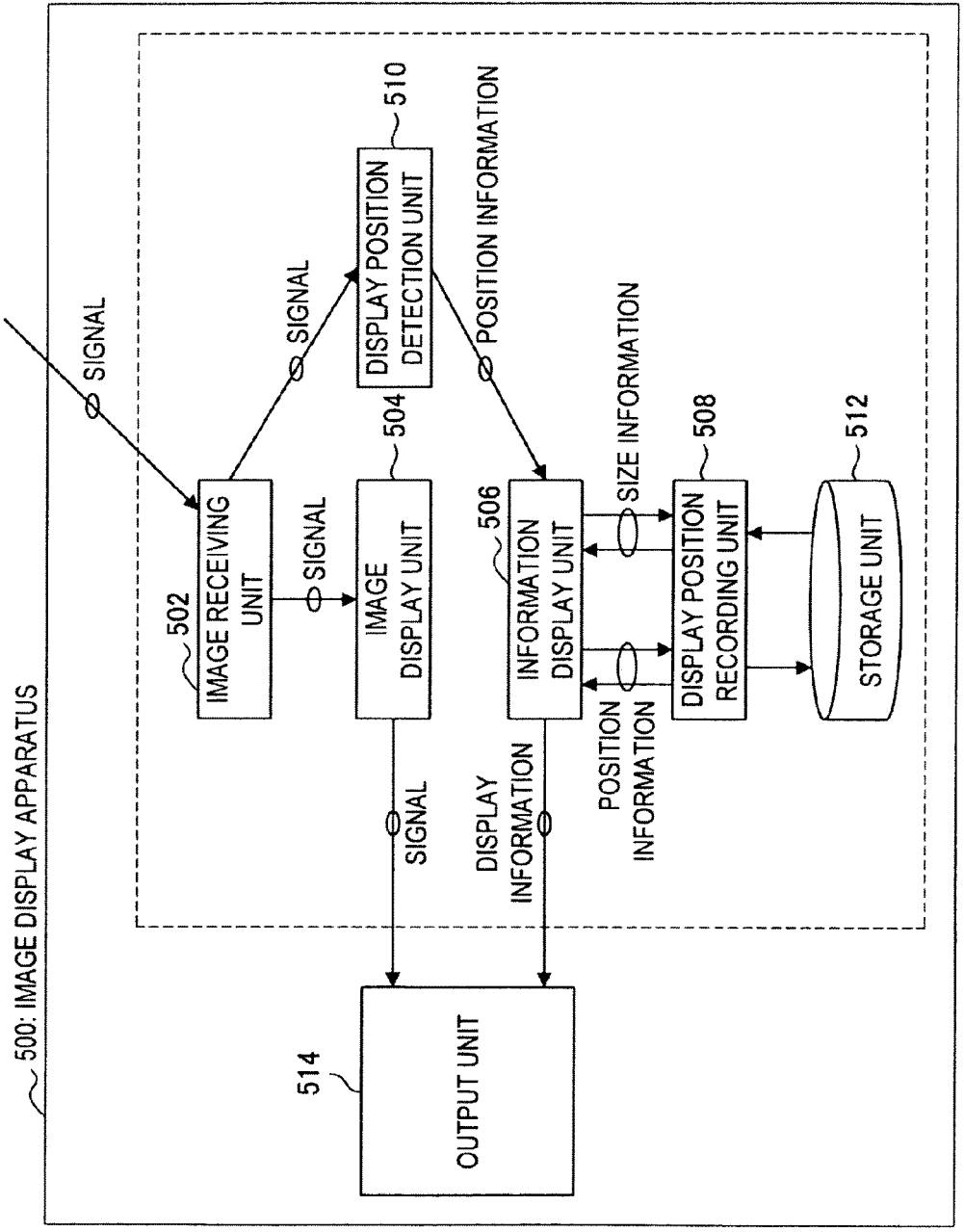
FIG. 4 is an explanatory view showing a function configuration of the image display apparatus according to the embodiment.

Next, the function configuration of the image display apparatus 500 according to the present embodiment will be described with reference to FIG. 4. FIG. 4 is an explanatory view showing a function configuration example of the image display apparatus 500 according to the present embodiment. The image display apparatus 500 is characterized by a function that masks additional display information superimposed on an image signal in the screen by predetermined display information provided by the image display apparatus 500.

As shown in FIG. 4, the image display apparatus 500 mainly includes an image receiving unit 502, an image display unit 504, an information display unit 506, a display position recording unit 508, a display position detection unit 510, a storage unit 512, and an output unit 514.

The image receiving unit 502 receives an image signal from a broadcasting station. Next, the image receiving unit 502 sends the received image signal to the image display unit 504 and the display position detection unit 510. It is assumed that the above image signal contains additional display information superimposed thereon, in addition to images. The additional display information here includes, for example, channel information, title information of a program, and time information.

The image display unit 504 receives an image signal from the image receiving unit 502. Then, the image display unit 504 sends the image signal received from the image receiving unit 502 to the output unit 514. The output unit 514 is a display output means to display an image signal. That is, the image display unit 504 is an example of the display control means to control display output by sending an image signal to the output unit 514. When the image signal is sent to the output unit 514, an image is displayed in the output unit 514. The user performs various kinds of operations such as a channel change while viewing the image signal displayed in the output unit 514.

In addition to the channel change, the above various operations include, for example, a volume change, brightness adjustments, and a tint change. These operations are performed by, for example, using the remote controller 108 illustrated in FIG. 2. The above various operations include operations to display OSDs, move the display position of OSDs, and change the display size of OSDs. In the description that follows, a display object exemplified by OSD may be denoted as a screen displayed OSD. The screen displayed OSD includes, for example, channel information displayed in the screen, title information of a program, and time information. Needless to say, the scope of technology according to the present embodiment is not limited to OSDs.

As described above, a screen displayed OSD is independent of additional display information delivered by being superimposed on an image signal (hereinafter, referred to simply as additional display information). Thus, the screen displayed OSD and additional display information may show duplicate content. If, in such a case, the screen displayed OSD and additional display information are duplicately displayed, the screen display becomes more complicated and the user is made uncomfortable. Thus, in the present embodiment, a technology to prevent additional display information and screen displayed OSD from duplicately being displayed by the display control of the screen displayed OSD is proposed. The technology will be described below in detail.

FIG. 4 will be referenced again. When an image signal is received from the image receiving unit 502, the display position detection unit 510 detects the display position of additional display information contained in the image signal. For example, the display position detection unit 510 holds shapes of channel logos of broadcasting stations those of letters used for time information and can detect the position of additional information contained in the image signal by performing pattern matching of these shapes.

As another example, the display position detection unit 510 may hold a database in which information about the position where additional display information is displayed, shape, size and the like is recorded for each channel. In this case, the display position detection unit 510 can detect the position and the like of additional display information corresponding to an image signal received by the image receiving unit 502 by referencing the database.

By providing the display position detection unit 510 having the above function configuration, the position or the like of additional display information contained in an image signal is automatically detected. Information about the position and the like of additional display information detected by the display position detection unit 510 is sent to the information display unit 506. In the present embodiment, the position or the like of additional display information is automatically detected, but if the position or the like of additional display information should be detected by visual inspection of the user, the display position detection unit 510 is omitted.

The information display unit 506 causes the output unit 514 to display the above screen displayed OSD. That is, the information display unit 506 is an example of the display control unit concerning the display of the screen displayed OSD. When information such as the display position and size of additional display information is received from the display position detection unit 510, the information display unit 506 decides the display position of the screen displayed OSD based on information such as the display position and size. An object of the present embodiment is, as described above, to hide additional display information by the screen displayed OSD. Thus, the information display unit 506 decides the position of additional display information received from the display position detection unit 510 as the display position of the screen displayed OSD. If size information of the additional display information is received from the display position detection unit 510, the information display unit 506 decides the display size of the screen displayed OSD based on the size information.

Then, the information display unit 506 adjusts the screen displayed OSD to the size decided in the manner described above and causes the output unit 514 to display the screen displayed OSD at the display position of the output unit 514 decided in the manner described above. If the display position or the like of additional display information should be detected by visual inspection of the user, the display method of the screen displayed OSD by the information display unit 506 will be as follows.

First, the user checks an image displayed in the output unit 514 by the image display unit 504 and also checks the position of additional display information. Next, the user decides the display position of the screen displayed OSD using the remote controller 108. Next, an IR signal emitted from the remote controller 108 is input into the image display apparatus 500 before being input into the information display unit 506. Then, the information display unit 506 decides the position of the screen displayed OSD based on information indicating the display position of the input screen displayed OSD and causes the output unit 514 to display the screen displayed OSD at the position.

Additional display information can be hidden by the screen displayed OSD using one of the above methods so that information of duplicate content can be prevented from being displayed in one screen. As a result, complicatedness of the screen display is restrained so that discomfort of the user will be removed. The display method of the screen displayed OSD will be described below.

As described above, the information display unit 506 can adjust the display position of the screen displayed OSD based on the position or the like of additional display information received from the display position detection unit 510. However, the display position of additional display information may be decided in advance depending on the type thereof or the broadcasting station. For such a type of additional display information, it is more efficient to hold information about the display position in advance and to make repeated use of the held information, instead of detecting the display position each time an image signal is received. Thus, the image display apparatus 500 is provided with a means to record the position or the like of additional display position. The means will be described below.

First, the information display unit 506 transmits position information and size information acquired from the display position detection unit 510 to the display position recording unit 508. The display position recording unit 508 records the position information and size information in the storage unit 512. Update timing and recording time of the position information and size information recorded in the storage unit 512 is optionally set. For example, the timing may be set so that the position information or size information is updated in a predetermined period. Alternatively, the timing may be set so that the position information or size information is updated or recorded, for example, when the channel is changed, the image display apparatus 500 is turned on, or the display of an image signal starts.

On the other hand, the position information and size information recorded in the storage unit 512 are read via the display position recording unit 508 when the screen displayed OSD is displayed in the output unit 514 by the information display unit 506. Then, the information display unit 506 sets the display position and display size of the screen displayed OSD based on the above position information and size information and causes the output unit 514 to display based on setting content thereof.

[Display Position Adjustment Method of the Screen Displayed OSD]

Next, the method of hiding additional display information by the screen displayed OSD will be described with reference to FIG. 5 to FIG. 9.

(Non-Display State of the Screen Displayed OSD)

Figure 5:
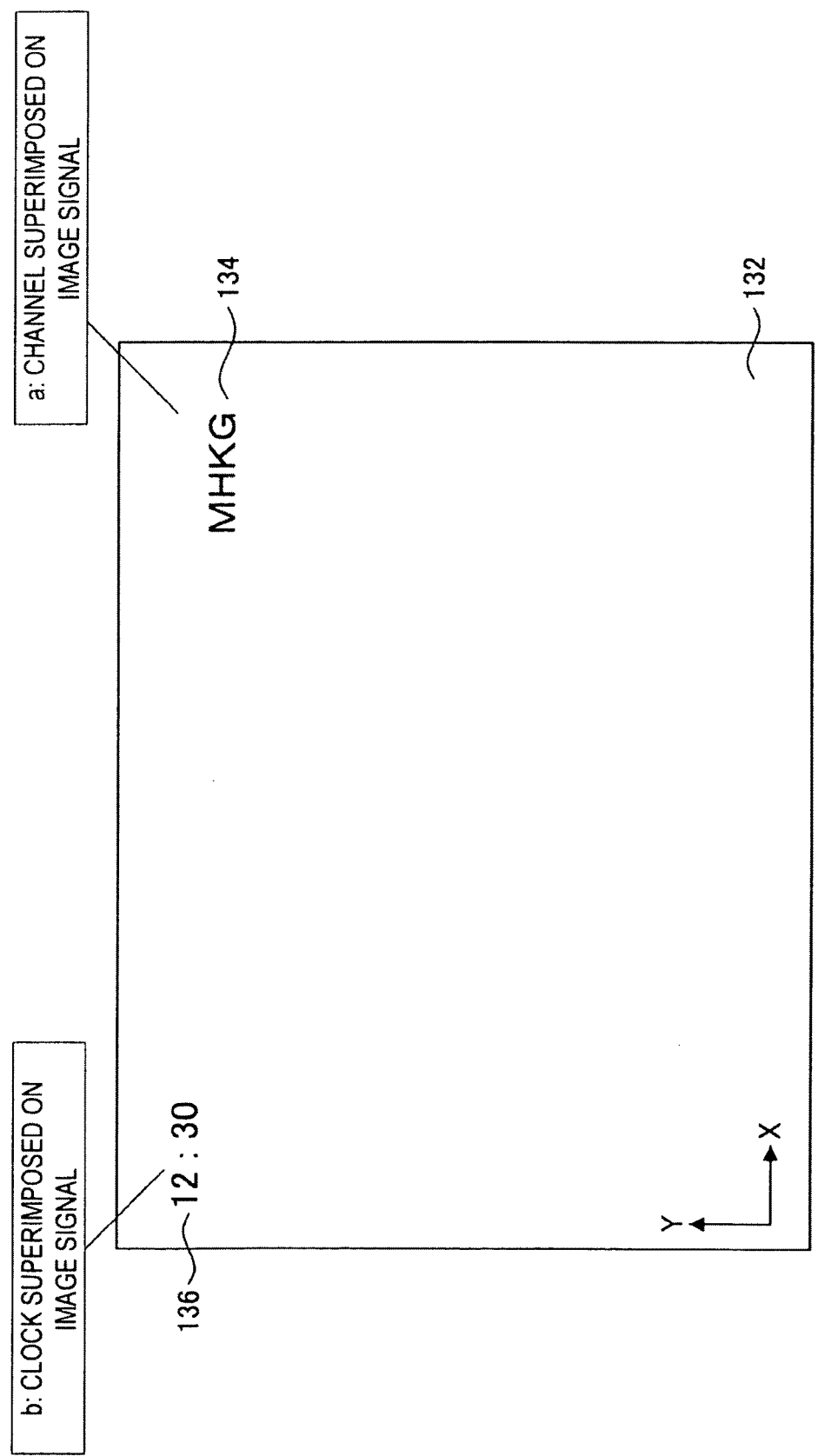
FIG. 5 is an explanatory view showing that additional display information is superimposed on the image display apparatus according to the embodiment.

FIG. 5 is an explanatory view exemplifying an image signal and additional display information displayed in the output unit 514. However, the example in FIG. 5 shows a state in which no screen displayed OSD is displayed. In FIG. 5, channel information 134 and time information 136 are shown as an example of additional display information. As described above, the information is provided by being superimposed on an image signal.

First, when the user sets the channel, the image display unit 504 displays additional display information by superimposing the additional display information on an image signal. As shown in FIG. 5, the additional display information refers to, for example, the information 136 about time and the information 134 about the set channel. The additional display information is not limited to the above information and may be, for example, information about a logo of a broadcasting station or a title of a program.

(Display State of the Screen Displayed OSD: Duplicate Display)

Figure 6:
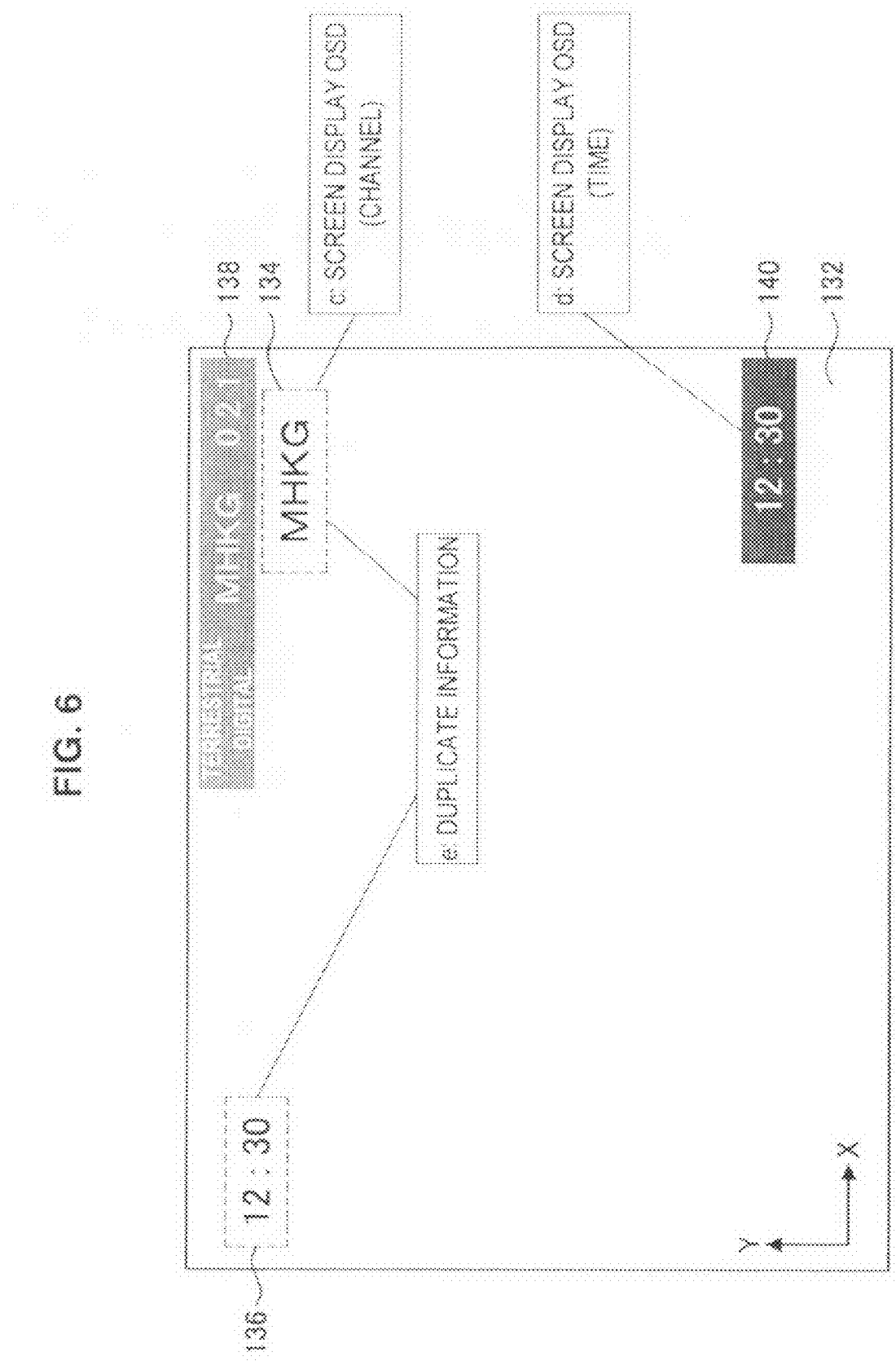
FIG. 6 is an explanatory view showing that a screen display OSD of the image display apparatus according to the embodiment is displayed in the screen.

FIG. 6 is an explanatory view exemplifying an image signal and additional display information displayed in the output unit 514. However, the example in FIG. 6 shows a state in which a screen displayed OSD is displayed.

When the display of a screen displayed OSD is set, as shown in FIG. 6, the information display unit 506 displays the screen displayed OSD separately from the additional display information. The screen displayed OSD refers to, for example, information 140 about time and information 138 about the set channel. The screen displayed OSD is not limited to the above information and may be, for example, information about a logo of a broadcasting station or the title of a program.

The image display unit 504 displays the information 136 about time and the information 134 about the set channel as additional display information. On the other hand, the information display unit 506 displays the information 140 about time and the information 138 about the set channel as the screen displayed OSD. The state in which predetermined information containing the same content is duplicately displayed in this manner in one screen is complicated and makes the user uncomfortable. Thus, in the present embodiment, as shown in FIG. 7 to FIG. 9, a technology to restrain complicatedness of the screen display described above is proposed.

(Display Position Adjustment Method of the Screen Displayed OSD)

Figure 7:
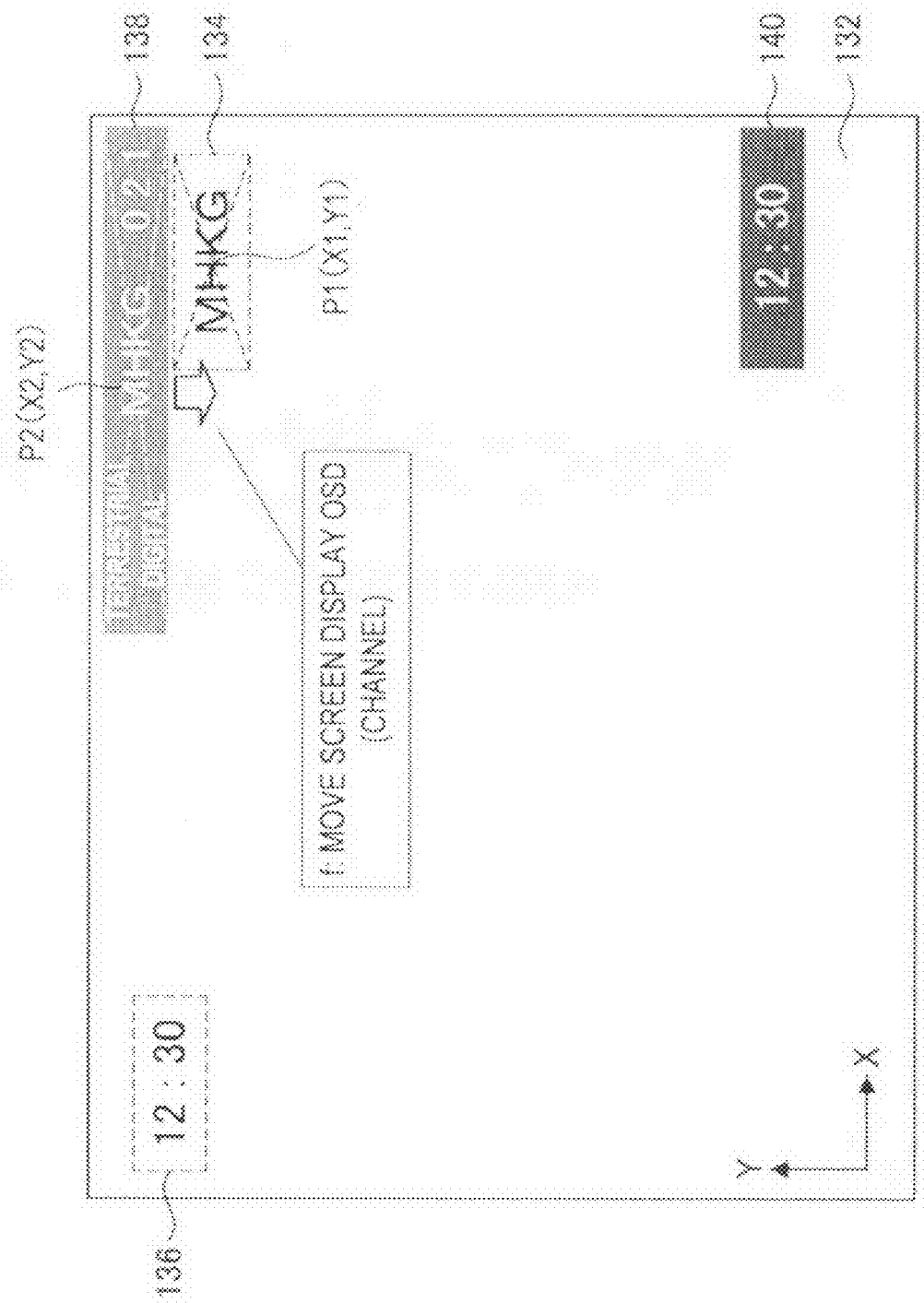
FIG. 7 is an explanatory view showing that the screen display OSD of the image display apparatus according to the embodiment moves in the screen.
Figure 8:
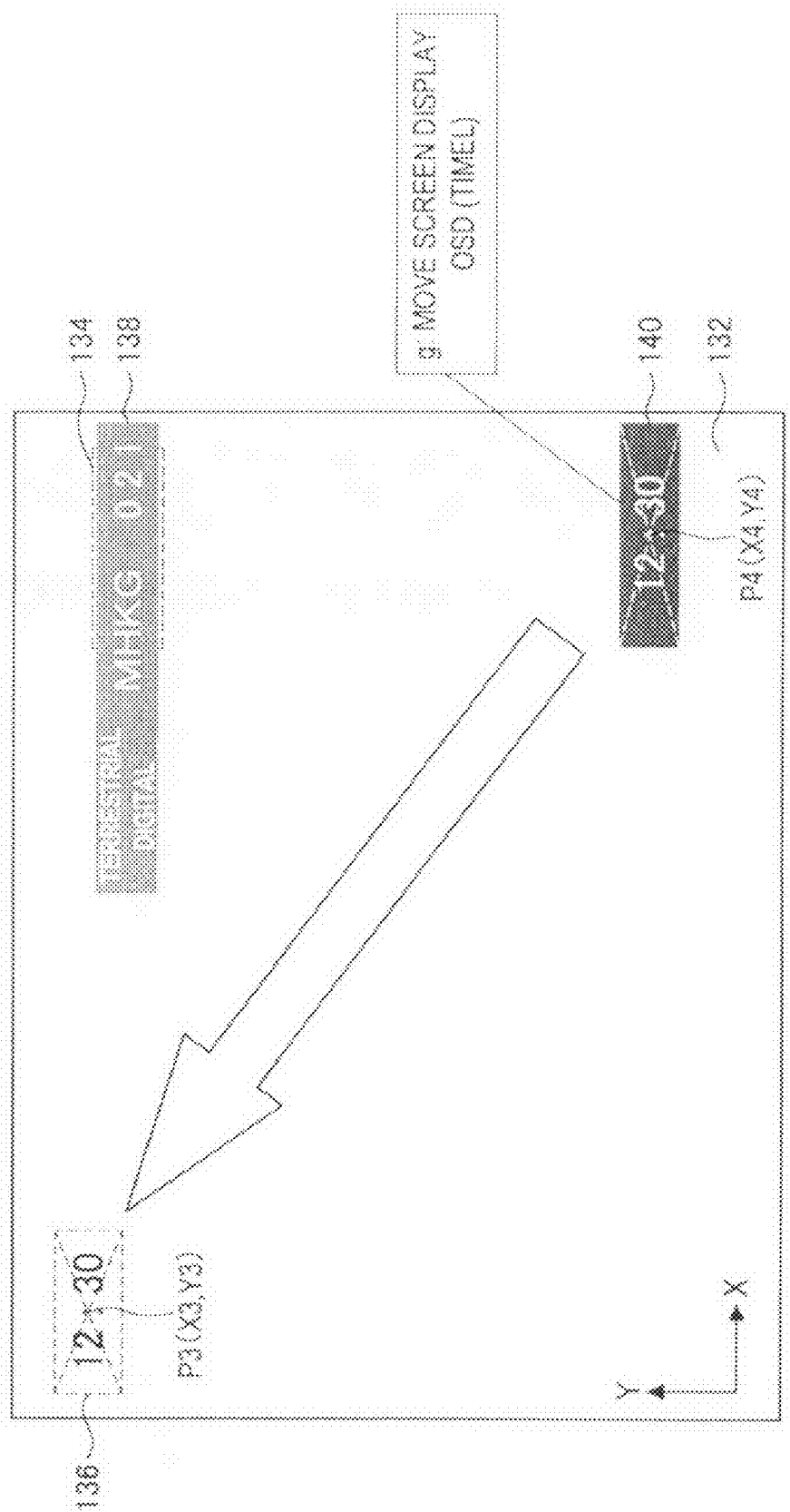
FIG. 8 is an explanatory view showing that the screen display OSD of the image display apparatus according to the embodiment moves in the screen.
Figure 9:
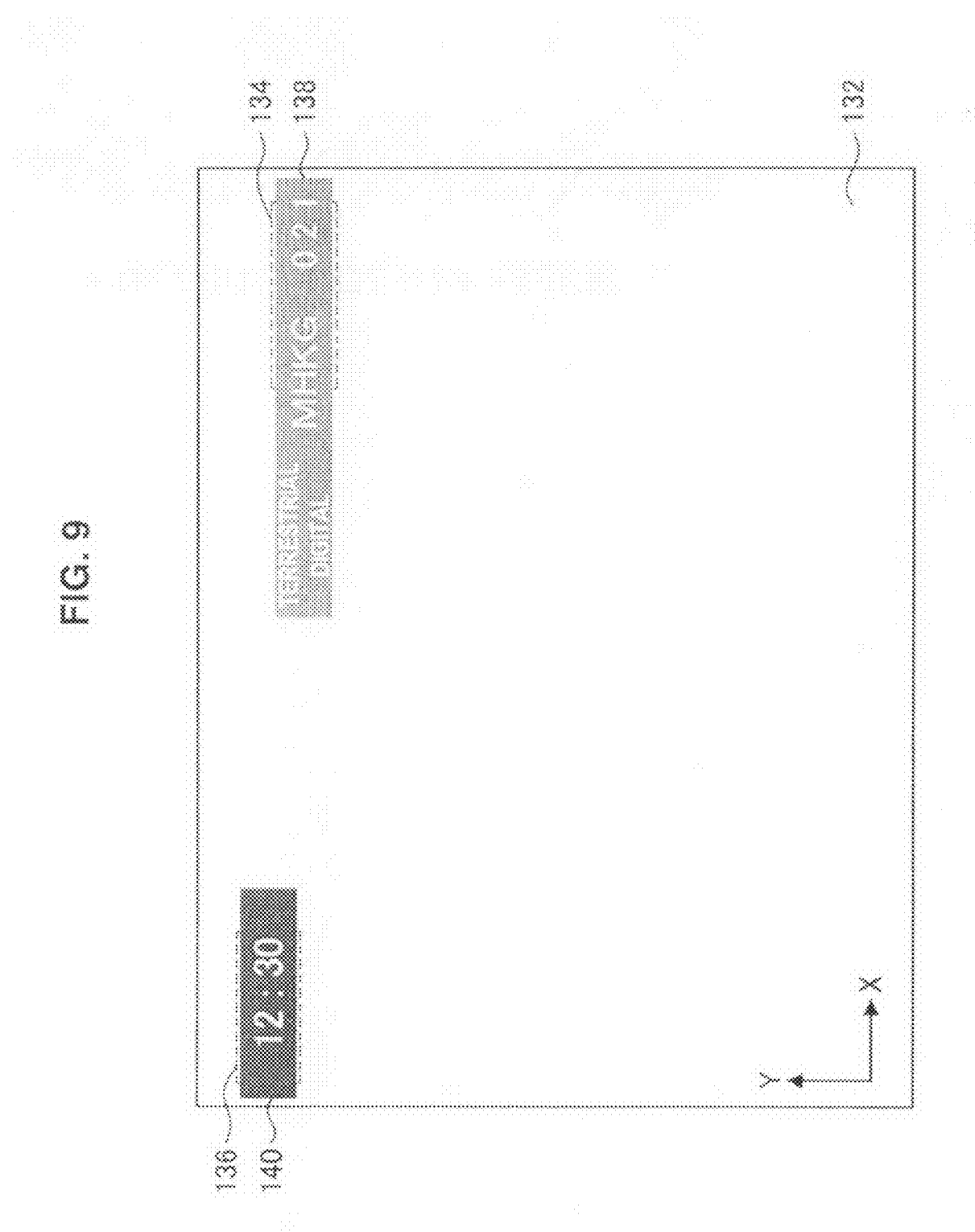
FIG. 9 is an explanatory view showing that the screen display OSD of the image display apparatus according to the embodiment hides additional display information.

FIG. 7 and FIG. 8 are explanatory views exemplifying an image signal and additional display information displayed in the output unit 514. FIG. 7 and FIG. 8 are also explanatory views showing the display position adjustment method of the screen displayed OSD.

First, as shown in FIG. 7, a case in which the information display unit 506 moves only information about the channel of display information will be described. That is, in the present embodiment, the information display unit 506 moves the information (hereinafter, denoted as the screen displayed OSD (channel)) 138 about the channel, which is a portion of the screen displayed OSD, so as to hide the information (hereinafter, denoted as the additional display information (channel)) 134 about the channel, which is a portion of the additional display information.

More specifically, if the screen displayed OSD (channel) 138 is assumed to be rectangular as shown in FIG. 7, coordinates of the central point where two diagonal lines intersect are set as P2 (X2, Y2). If the additional display information (channel) 134 is similarly assumed to be rectangular as shown by dotted lines in FIG. 7, coordinates of the central point where two diagonal lines intersect are set as P1 (X1, Y1).

As shown in FIG. 7, three cases shown below are considered regarding relationship between the coordinates P1 and P2:

(a) X1 and X2 are not equal or Y1 and Y2 are not equal (b) X1 and X2 and Y1 and Y2 are both not equal (c) X1 and X2 and Y1 and Y2 are both equal For (c) of the above cases, the information display unit 506 does not necessarily have to move the screen displayed OSD (channel) 138.

For (a) or (b) of these three cases, the information display unit 506 moves the screen displayed OSD (channel) 138 if necessary. If the screen displayed OSD (channel) 138 should be moved, the information display unit 506 may move the central point P2 (X2, Y2) of the screen displayed OSD (channel) 138 to P1 (X1, Y1), but does not necessarily have to move P2 (X2, Y2) up to P1 (X1, Y1). In the present embodiment, as described above, it is enough that the additional display information (channel) 134 is completely hidden by the screen displayed OSD (channel) 138.

Thus, for example, it may be necessary to move only the Y coordinate of the central point of the screen displayed OSD (channel) 138 to Y1, which is the Y coordinate of the additional display information (channel) 134. Also, it may be necessary for the information display unit 506 to move only the X coordinate of the central point of the screen displayed OSD (channel) 138 to X1, which is the X coordinate of the additional display information (channel) 134, without the screen displayed OSD (channel) 138 being moved in the Y direction. Thus, the additional display information (channel) 134 can be hidden not to be displayed in the screen by the display position of the screen displayed OSD being adjusted appropriately.

The information display unit 506 hides the additional display information (channel) 134 by adjusting the display position of the screen displayed OSD (channel) 138 in the manner described above. Such a function is realized by, for example, position information of the additional display information (channel) 134 being detected by the display position detection unit 510 and the position information being transmitted to the information display unit 506. Such a function is also realized by the remote controller 108 being operated by the user.

Even for the case of (a) or (b) among (a) to (c) shown above, a letter portion of the additional display information (channel) 134 may not be displayed in the screen before the information display unit 506 moves the screen displayed OSD (channel) 138. Thus, if the additional display information (channel) 134 is completely hidden by screen displayed OSD, there is no need to perform movement processing of the screen displayed OSD (channel) 138.

Next, as shown in FIG. 8, first, a case in which the information display unit 506 moves information about time of display information, in addition to information about the channel, will be described.

As shown in FIG. 8, the information display unit 506 causes the screen displayed OSD (channel) 138 to hide the additional display information (channel) 134. Then, the information display unit 506 moves the screen displayed OSD (time) 140 to cause the information 140 about time, which is a portion of the screen displayed OSD, to hide the information 136 about time, which is a portion of the additional display information. In the description that follows, the information 140 about time, which is a portion of the screen displayed OSD, is denoted as the screen displayed OSD (time) 140. Similarly, the information 136 about time, which is a portion of the additional display information, is denoted as the additional display information (time) 136.

More specifically, as described above, just like when the information display unit 506 causes the screen displayed OSD (channel) 138 to hide the additional display information (channel) 134, the information display unit 506 moves the screen displayed OSD (time) 140. More specifically, the screen displayed OSD (time) 140 is assumed to be rectangular, coordinates of the central point where two diagonal lines intersect are set as P4 (X4, Y4). If the additional display information (time) 136 is similarly assumed to be rectangular, coordinates of the central point where two diagonal lines intersect are set as P3 (X3, Y3).

As described above, just like when the information display unit 506 causes the screen displayed OSD (channel) 138 to hide the additional display information (channel) 134, the central point of the screen displayed OSD (time) 140 moves to P3 (X3, Y3) to hide the additional display information (time) 136. There is no need for the central point of the screen displayed OSD (time) 140 to move to exactly P3 (X3, Y3) to hide the additional display information (time) 136.

The information display unit 506 may move the screen displayed OSD (time) 140 only in the X direction without moving in the Y direction to hide the additional display information (time) 136. Alternatively, the information display unit 506 may move the screen displayed OSD (time) 140 only in the Y direction without moving in the X direction to hide the additional display information (time) 136. That is, it is necessary for the information display unit 506 only to move the screen displayed OSD (time) 140 so that the additional display information (time) 136 is completely hidden by the screen displayed OSD (time) 140.

As described above, the information display unit 506 causes the screen displayed OSD (time) 140 to hide the additional display information (time) 136. Such a function is realized by position information of the additional display information (time) 136 being detected by the display position detection unit 510 and the position information being transmitted to the information display unit 506 for adjustments of the display position of the screen displayed OSD by the information display unit 506. Such a function can also be realized by the remote controller 108 being operated by the user.

FIG. 9 illustrates a state in which the additional display information (channel) 134 and the additional display information (time) 136 are hidden in a screen 132 by using the display position adjustment method of the screen displayed OSD described with reference to FIG. 7 and FIG. 8. Compared with display information in the screen 132 shown in FIG. 6, complicatedness is cleared away from display information in the screen 132 shown in FIG. 9. With such a display configuration, the user will not be made uncomfortable.

The display information is not limited to information about the channel or time and may be, for example, information about the program name or the like. Like examples shown in FIG. 7 to FIG. 9, display information about the program name or the like is hidden by adjusting the display position of the screen displayed OSD so that complicatedness is cleared away and the user will not be made uncomfortable.

In the examples described above, the additional display information (channel) 134 is hidden by the screen displayed OSD (channel) 138 and the additional display information (time) 136 by the screen displayed OSD (time) 140. However, the information display unit 506 may move the screen displayed OSD (time) 140 so that the additional display information (channel) 134 is hidden by the screen displayed OSD (time) 140. Also, the information display unit 506 may move the screen displayed OSD (channel) 138 so that the additional display information (time) 136 is hidden by the screen displayed OSD (channel) 138.

In the examples described above, the screen displayed OSD (channel) 138 is first moved and then, the screen displayed OSD (time) 140 is moved, but there is no need to follow this order of movement. That is, the information display unit 506 may first move the screen displayed OSD (time) 140 and then, the screen displayed OSD (channel) 138. Alternatively, the information display unit 506 may move the screen displayed OSD (time) 140 and the screen displayed OSD (channel) 138 simultaneously.

In the foregoing, the technology to prevent duplicate information from being displayed in the screen by adjusting the display position of the screen displayed OSD to hide additional display information provided by being superimposed on an image signal has been described. However, if there is a difference in size or shape between the screen displayed OSD and additional display information, it may become necessary for the information display unit 506 to change the size or shape of the screen displayed OSD. Even if there is no need to change the size, additional display information may be hidden with a smaller amount of processing by combining movement of the display position and size change. In such a case, it is more effective to actively use the size change or shape change. From such a viewpoint, a case in which the information display unit 506 changes the size or shape of the screen displayed OSD will be described below.

[Size Adjustment Method of the Screen Displayed OSD]

Next, the adjustment method of the screen displayed OSD will be described with reference to FIG. 10 to FIG. 18. Here, a case in which the size of the screen displayed OSD is adjusted and also the shape thereof is changed will be described.

(Display State of the Screen Displayed OSD: Overlapped Display)

Figure 10:
FIG. 10 is an explanatory view showing that a screen display OSD of the image display apparatus according to the embodiment is displayed in the screen.

FIG. 10 is an explanatory view exemplifying an image signal and additional display information displayed in the output unit 514. The example in FIG. 10 shows a state in which a screen displayed OSD is displayed. First, when the user sets the channel, the image display unit 504 displays additional display information by superimposing the additional display information on an image signal. As shown in FIG. 10, the additional display information refers to, for example, information 236 about time and information 234 about the set channel. The additional display information is not limited to the above information and may be, for example, information about the title of a program.

Figure 11:
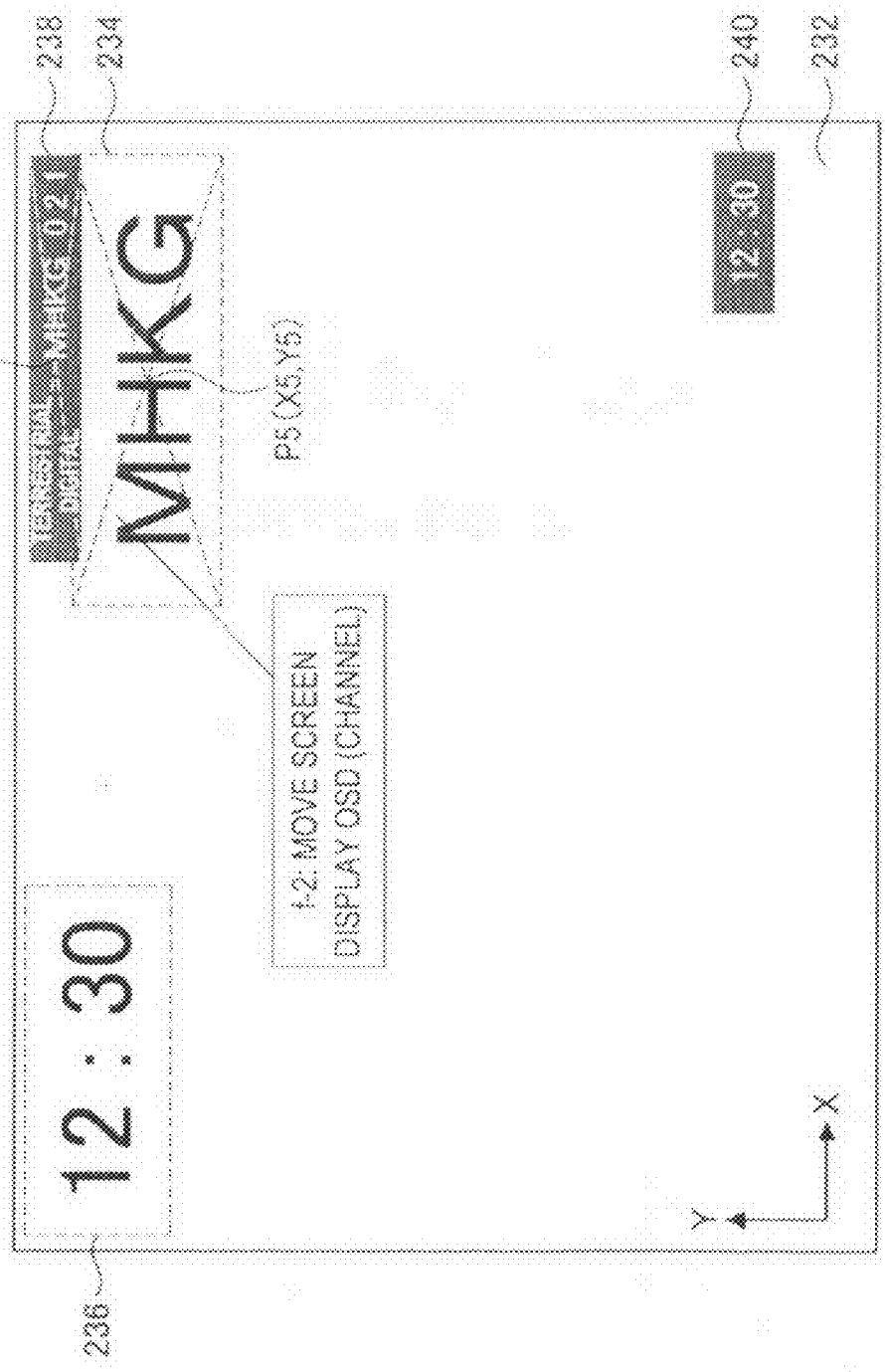
FIG. 11 is an explanatory view showing that the screen display OSD of the image display apparatus according to the embodiment moves in the screen.

When the display of a screen displayed OSD is set, as shown in FIG. 11, the information display unit 506 displays the screen displayed OSD separately from the additional display information. The screen displayed OSD refers to, for example, information 240 about time and information 238 about the set channel. The screen displayed OSD is not limited to the above information and may be, for example, information about a logo of a broadcasting station or the title of a program.

Figure 12:
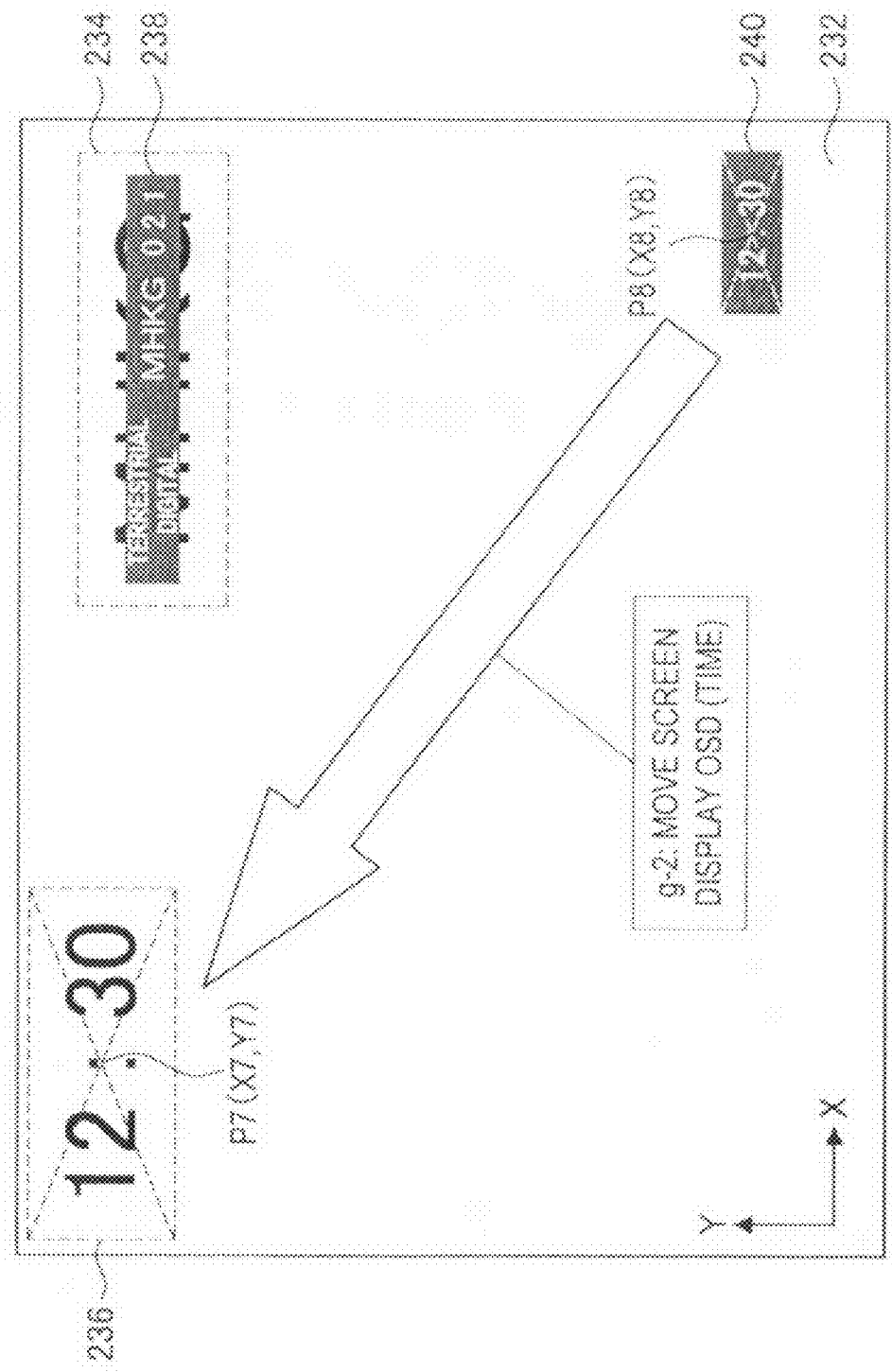
FIG. 12 is an explanatory view showing that the screen display OSD of the image display apparatus according to the embodiment moves in the screen.

In the present embodiment, a mode in which the information display unit 506 first moves display information and then, changes the size of the display information will be described. Regarding movement of the display information, the method is similar to the display position adjustment method of the screen displayed OSD described with reference to FIG. 7 and FIG. 8. That is, as shown in FIG. 11 and FIG. 12, the information display unit 506 moves the screen displayed OSD (channel) 238 so that the additional display information (channel) 234 is hidden by the screen displayed OSD (channel) 238. Also, the information display unit 506 moves the screen displayed OSD (time) 240 so that the additional display information (time) 236 is hidden by the screen displayed OSD (time) 240.

Figure 13:
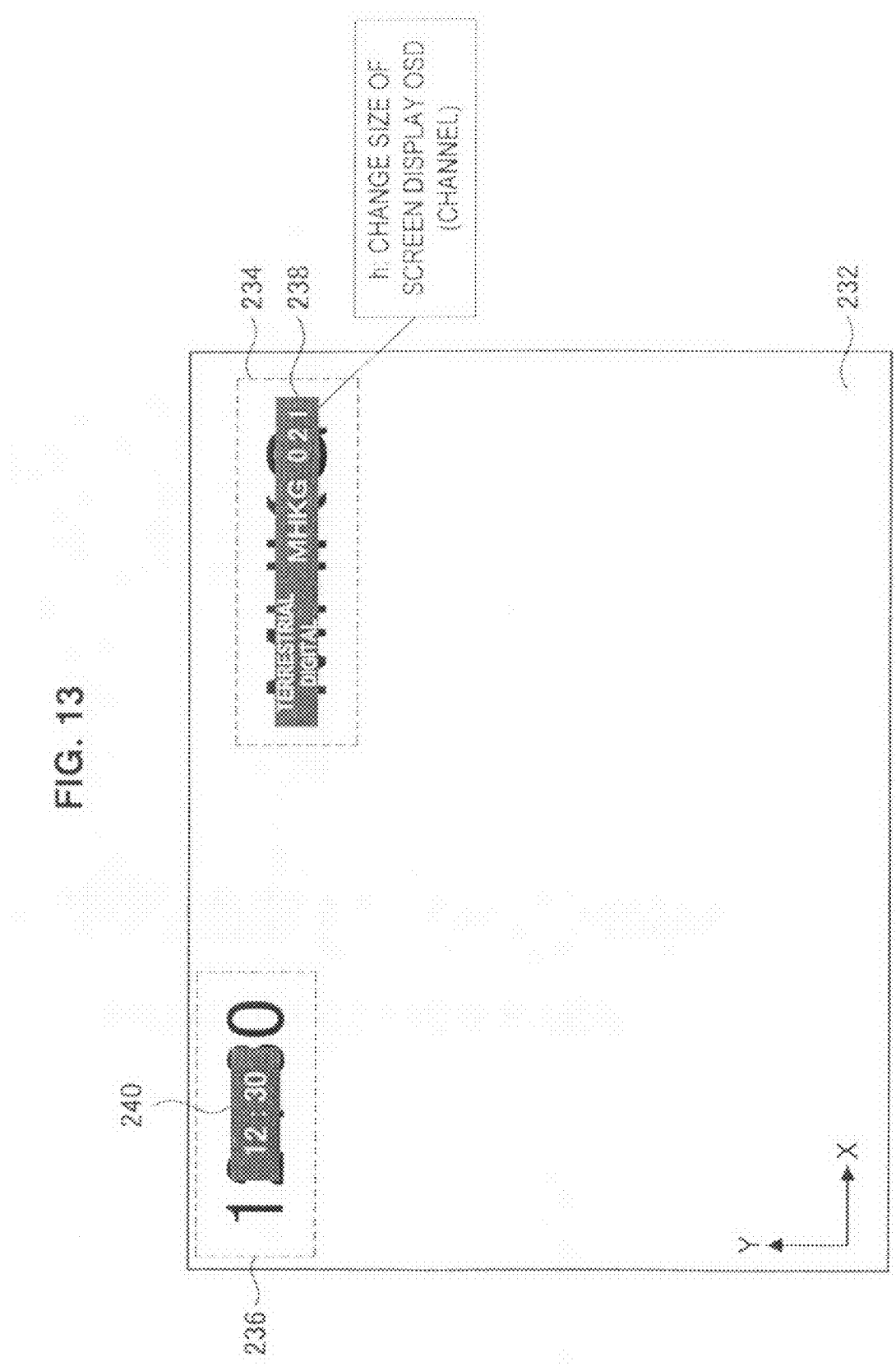
FIG. 13 is an explanatory view showing that the screen display OSD of the image display apparatus according to the embodiment changes in size in the screen.
Figure 14:
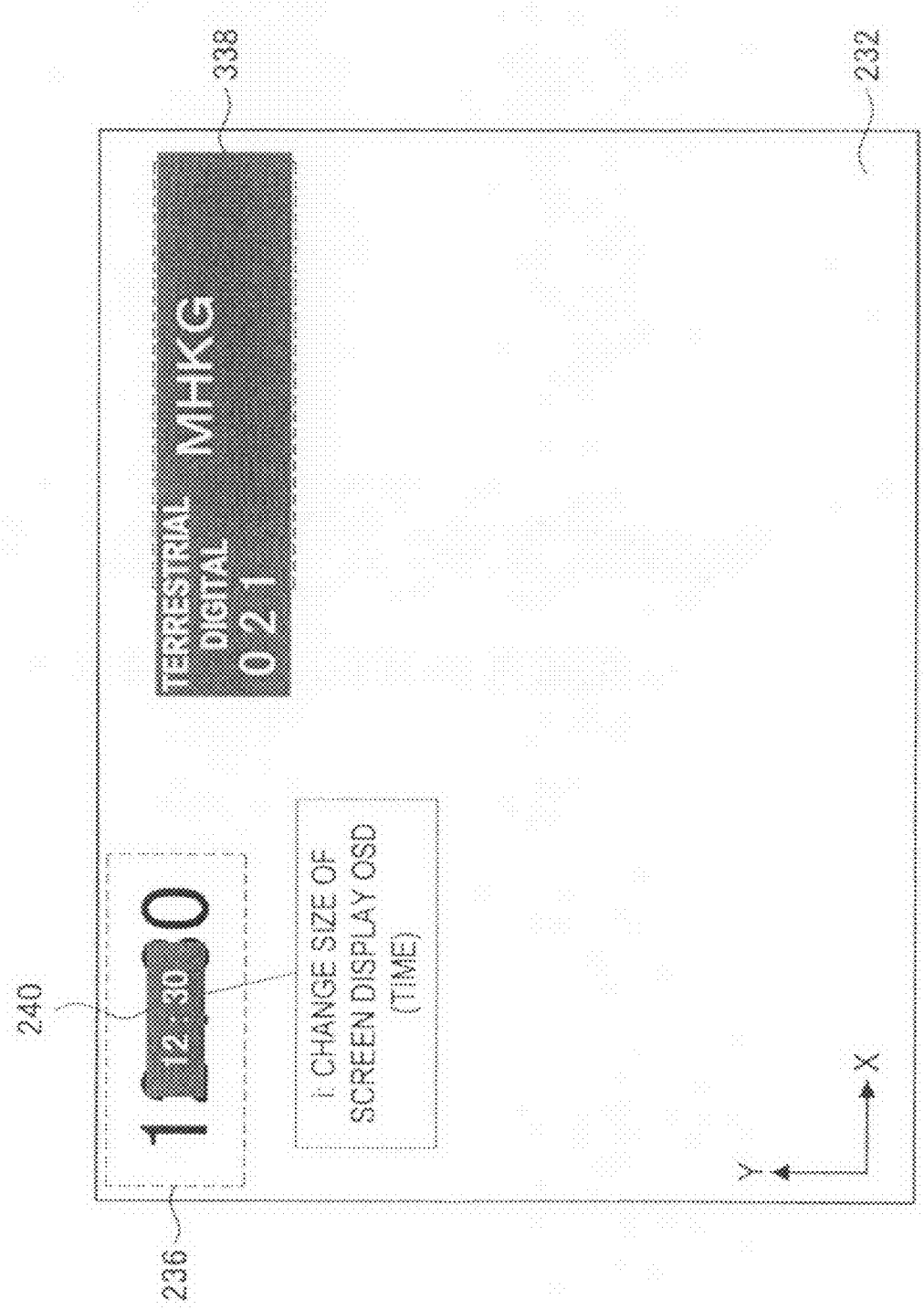
FIG. 14 is an explanatory view showing that the screen display OSD of the image display apparatus according to the embodiment changes in size in the screen.

FIG. 13 illustrates a state in which the screen displayed OSD (channel) 238 and the screen displayed OSD (time) 240 are moved in a screen 232 by using the display position adjustment method of the screen displayed OSD described with reference to FIG. 11 and FIG. 12. The additional display information (channel) 234 may not be hidden when the information display unit 506 moves only the screen displayed OSD (channel) 238. Similarly, additional display information (time) 236 may not be hidden when the information display unit 506 moves only the screen displayed OSD (time) 240. Thus, the state in which it is difficult for the screen displayed OSD to completely hide additional display information and thus the screen displayed OSD and the additional display information are overlapped is complicated and the user is made uncomfortable. Thus, as shown in FIG. 10 to FIG. 18, in the present embodiment, a technology to restrain complicatedness of the screen display described above is proposed.

(Display Position Adjustment Method of the Screen Displayed OSD)

A case in which it is difficult for the screen displayed OSD to hide additional display information is, for example, when the additional display information is larger than the screen displayed OSD. In this case, even if the screen displayed OSD is brought closer to the center of the additional display information, as shown in FIG. 10, to prevent the additional display information from being displayed in the screen 232 if possible, it is difficult for the screen displayed OSD to completely hide additional display information. Also when the shape of the screen displayed OSD and that of the additional display information are significantly different, the additional display information may not be hidden completely.

A case in which the information display unit 506 moves the screen displayed OSD so that the additional display information is prevented from being displayed in the screen 232 if possible will be described by taking movement of the screen displayed OSD (channel) 238 in FIG. 11 as an example. If the screen displayed OSD (channel) 238 is assumed to be rectangular, the central point where two diagonal lines of the rectangle intersect is set as P6 (X6, Y6). If the additional display information (channel) 234 is also assumed to be rectangular as shown by dotted lines, the central point where two diagonal lines of the rectangle intersect are set as P5 (X5, Y5).

If, in such a case, P6 (X6, Y6) and P5 (X5, Y5) are different positions, in order for the screen displayed OSD (channel) 238 to hide the additional display information (channel) 234, the information display unit 506 moves the central point of the screen displayed OSD (channel) 238 to P5 (X5, Y5).

Similarly with reference to FIG. 12, movement of the screen displayed OSD (time) 240 will be described in a case in which the information display unit 506 moves the screen displayed OSD so that additional display information is prevented from being displayed in the screen 232 if possible. If the screen displayed OSD (time) 240 is assumed to be rectangular, the central point where two diagonal lines of the rectangle intersect is set as P8 (X8, Y8). If the additional display information (time) 236 is also assumed to be rectangular as shown by dotted lines, the central point where two diagonal lines of the rectangle intersect are set as P7 (X7, Y7).

If, in such a case, P8 (X8, Y8) and P7 (X7, Y7) are different positions, in order for the screen displayed OSD (time) 240 to hide the additional display information (time) 236, the information display unit 506 moves the central point of the screen displayed OSD (time) 240 to P7 (X7, Y7).

FIG. 13 is a diagram showing a state in which additional display information is prevented from being displayed in the screen 232 if possible by the display position adjustment method of the screen displayed OSD described with reference to FIG. 12 and FIG. 13. Since the size of the screen displayed OSD (channel) 238 is smaller than that of the additional display information (channel) 234, it is difficult for the screen displayed OSD (channel) 238 to completely hide the additional display information (channel) 234. Also, since the size of the screen displayed OSD (time) 240 is smaller than that of the additional display information 236, it is difficult for the screen displayed OSD (time) 240 to completely hide the additional display information 236. In this case, the information display unit 506 can completely hide additional display information by appropriately changing the size or shape of the screen displayed OSD (channel) 238 and the screen displayed OSD (time) 240.

(Display State after Size Adjustments of the Screen Displayed OSD)

First, a case in which the information display unit 506 changes the size of only the screen displayed OSD (channel) 238 will be described. The information display unit 506 extends the screen displayed OSD (channel) 238 shown in FIG. 13 in the Y and X directions in length. As a result, the screen displayed OSD (channel) 238 becomes a screen displayed OSD (channel) 338 shown in FIG. 14. The information display unit 506 also extends the screen displayed OSD (time) 240 shown in FIG. 14 in the Y and X directions in length. As a result, the screen displayed OSD (time) 240 becomes a screen displayed OSD (time) 340 having the size shown in FIG. 15. As shown in FIG. 15, with such a size change, the screen displayed OSD (channel) 238 hides the additional display information (channel) 234. Similarly, with such a size change, the screen displayed OSD (time) 240 hides the additional display information (time) 236.

As described above, the information display unit 506 causes the screen displayed OSD (channel) 338 to hide the additional display information (channel) 234. The information display unit 506 also causes the screen displayed OSD (time) 340 to hide the additional display information (time) 236. Such a function is realized by size information of additional display information being detected by the display position detection unit 510 and the screen displayed OSD being displayed by the information display unit 506 in the size indicated by the size information. Such a function can also be realized by the remote controller 108 being operated by the user.

FIG. 15 illustrates, as described with reference to FIG. 12 and FIG. 13, a state in which the additional display information (channel) 234 and the additional display information (time) 236 are hidden by the screen displayed OSD (channel) 338 and the screen displayed OSD (time) 340 in the screen 232 respectively. Compared with display information in the screen 232 shown in FIG. 11 or FIG. 13, complicatedness is cleared away from display information in the screen 232 shown in FIG. 15. With such a display configuration, the user will not be made uncomfortable.

(Method of Changing the Size of the Screen Displayed OSD)

Next, the method of changing the size (method of changing the shape) of the screen displayed OSD will be described with reference to FIG. 16 to FIG. 21.

With reference to FIG. 16 to FIG. 18, changing the size of the screen displayed OSD (channel) 238 and changing the shape of the screen displayed OSD (channel) 238 will be described.

First, FIG. 16 will be referenced. Before the size is adjusted, the screen displayed OSD (channel) 238 has a length b1 in the X direction, which is equal to or substantially equal to a length b2 in the X direction of the additional display information (channel) 234. Thus, the information display unit 506 does not adjust the length in the X direction. However, before the size is adjusted, the screen displayed OSD (channel) 238 has a length a1 in the Y direction, which is shorter than a length a2 in the Y direction of the additional display information (channel) 234. Thus, the formation display unit 506 adjusts the length in the Y direction. That is, the information display unit 506 extends the length of the screen displayed OSD (channel) 238 in the Y direction to a2.

The information display unit 506 may extend the length by maintaining the ratio in the Y and X directions of the screen displayed OSD (channel) 238 before size adjustments. The information display unit 506 may also extend the screen displayed OSD (channel) 238 in the Y direction more than necessary to hide the additional display information (channel) 234.

Further, if the screen displayed OSD (channel) 238 is rectangular, the shape thereof may be changed, for example, to an elliptic, rhombic, or polygonal shape. As long as additional display information (channel) is completely hidden by the screen displayed OSD (channel) 238, the screen displayed OSD (channel) 238 may take various shapes. Various kinds of size change may be made by considering not only the purpose of completely hiding the additional display information (channel) 234, but also to make letter information about the channel easier to view in the screen 232 and to fit the design of letter information about the channel to preferences of the user.

Next, FIG. 17 will be referenced. Before the size is adjusted, the screen displayed OSD (channel) 238 has a length a1 in the Y direction, which is equal to or substantially equal to a length a2 in the Y direction of the additional display information (channel) 234. Thus, the information display unit 506 does not adjust the length in the Y direction. However, before the size is adjusted, the screen displayed OSD (channel) 238 has a length b1 in the X direction, which is shorter than a length b2 in the X direction of the additional display information (channel) 234. Thus, the formation display unit 506 adjusts the length in the X direction. That is, the information display unit 506 extends the length of the screen displayed OSD (channel) 238 in the X direction to b2.

The information display unit 506 may extend the length by maintaining the ratio in the Y and X directions of the screen displayed OSD (channel) 238 before size adjustments. The information display unit 506 may also extend the screen displayed OSD (channel) 238 in the X direction more than necessary to hide the additional display information (channel) 234.

Further, if the screen displayed OSD (channel) 238 is rectangular, the shape thereof may be changed, for example, to an elliptic, rhombic, or polygonal shape. As long as additional display information (channel) is completely hidden by the screen displayed OSD (channel) 238, the screen displayed OSD (channel) 238 may take various shapes. Various kinds of size change may be made by considering not only the purpose of completely hiding the additional display information (channel) 234, which is an object of the present embodiment, but also to make letter information about the channel easier to view in the screen 232 and to fit the design of letter information about the channel to preferences of the user.

Next, FIG. 18 will be referenced. Before the size is adjusted, the length a1 in the Y direction of the screen displayed OSD (channel) 238 is shorter than the length a2 in the Y direction of the additional display information (channel) 234. Also, the length b1 in the X direction of the screen displayed OSD (channel) 238 is shorter than the length b2 in the X direction of the additional display information (channel) 234. Thus, the information display unit 506 adjusts the size both in the X and Y directions of the screen displayed OSD (channel) 238. That is, the information display unit 506 extends the length of the screen displayed OSD (channel) 238 in the X direction to b2 and that of the screen displayed OSD (channel) 238 in the Y direction to a2.

The information display unit 506 may extend the length by maintaining the ratio in the Y and X directions of the screen displayed OSD (channel) 238 before size adjustments. The information display unit 506 may also extend the screen displayed OSD (channel) 238 in the X direction more than necessary to hide the additional display information (channel) 234. The information display unit 506 may also extend the screen displayed OSD (channel) 238 in the Y direction more than necessary to hide the additional display information (channel) 234.

Further, if the screen displayed OSD (channel) 238 is rectangular, the shape thereof may be changed, for example, to an elliptic, rhombic, or polygonal shape. As long as additional display information (channel) is completely hidden by the screen displayed OSD (channel) 238, the screen displayed OSD (channel) 238 may take various shapes. Various kinds of size change may be made by considering not only the purpose of completely hiding the additional display information (channel) 234, but also to make letter information about the channel easier to view in the screen 232 and to fit the design of letter information about the channel to preferences of the user.

Next, with reference to FIG. 19 to FIG. 21, changing the size of the screen displayed OSD (time) 240 and changing the shape of the screen displayed OSD (time) 240 will be described.

First, FIG. 19 will be referenced. Before the size is adjusted, the screen displayed OSD (time) 240 has a length b3 in the X direction, which is equal to or substantially equal to a length b4 in the X direction of the additional display information (time) 236. Thus, the information display unit 506 does not adjust the length in the X direction. However, before the size is adjusted, the screen displayed OSD (time) 240 has a length a3 in the Y direction, which is shorter than a length a4 in the Y direction of the additional display information (time) 236. Thus, the formation display unit 506 adjusts the length in the Y direction. That is, the information display unit 506 extends the length of the screen displayed OSD (time) 240 in the Y direction to a4.

The information display unit 506 may extend the length by maintaining the ratio in the Y and X directions of the screen displayed OSD (time) 240 before size adjustments. The information display unit 506 may also extend the screen displayed OSD (time) 240 in the Y direction more than necessary to hide the additional display information (time) 236.

Further, if the screen displayed OSD (time) 240 is rectangular, the shape thereof may be changed, for example, to an elliptic, rhombic, or polygonal shape. As long as additional display information (time) is completely hidden by the screen displayed OSD (time) 240, the screen displayed OSD (time) 240 may take various shapes. Various kinds of size change may be made by considering not only the purpose of completely hiding the additional display information (time) 236, but also to make letter information about time easier to view in the screen 232 and to fit the design of letter information about time to preferences of the user.

Next, FIG. 20 will be referenced. Before the size is adjusted, the screen displayed OSD (time) 240 has a length a3 in the Y direction, which is equal to or substantially equal to a length a4 in the Y direction of the additional display information (time) 236. Thus, the information display unit 506 does not adjust the length in the Y direction. However, before the size is adjusted, the screen displayed OSD (time) 240 has a length b3 in the X direction, which is shorter than a length b4 in the X direction of the additional display information (time) 236. Thus, the information display unit 506 adjusts the length in the X direction. That is, the information display unit 506 extends the length of the screen displayed OSD (time) 240 in the X direction to b4.

The information display unit 506 may extend the length by maintaining the ratio in the Y and X directions of the screen displayed OSD (time) 240 before size adjustments. The information display unit 506 may also extend the screen displayed OSD (time) 240 in the X direction more than necessary to hide the additional display information (time) 236.

Further, if the screen displayed OSD (time) 240 is rectangular, the shape thereof may be changed, for example, to an elliptic, rhombic, or polygonal shape. As long as additional display information (time) is completely hidden by the screen displayed OSD (time) 240, the screen displayed OSD (time) 240 may take various shapes. Various kinds of size change may be made by considering not only the purpose of completely hiding the additional display information (time) 236, which is an object of the present embodiment, but also to make letter information about time easier to view in the screen 232 and to fit the design of letter information about time to preferences of the user.

Next, FIG. 21 will be referenced. Before the size is adjusted, the length a3 in the Y direction of the screen displayed OSD (time) 240 is shorter than the length a4 in the Y direction of the additional display information (time) 236. Also, the length b3 in the X direction of the screen displayed OSD (time) 240 is shorter than the length b4 in the X direction of the additional display information (time) 236. Thus, the information display unit 506 adjusts the size both in the X and Y directions of the screen displayed OSD (time) 240. That is, the information display unit 506 extends the length of the screen displayed OSD (time) 240 in the X direction to b4 and that of the screen displayed OSD (time) 240 in the Y direction to a4.

The information display unit 506 may extend the length by maintaining the ratio in the Y and X directions of the screen displayed OSD (time) 240 before size adjustments. The information display unit 506 may also extend the screen displayed OSD (time) 240 in the X direction more than necessary to hide the additional display information (time) 236. The information display unit 506 may also extend the screen displayed OSD (time) 240 in the Y direction more than necessary to hide the additional display information (time) 236.

Further, if the screen displayed OSD (time) 240 is rectangular, the shape thereof may be changed, for example, to an elliptic, rhombic, or polygonal shape. As long as additional display information (time) is completely hidden by the screen displayed OSD (time) 240, the screen displayed OSD (time) 240 may take various shapes. Various kinds of size change may be made by considering not only the purpose of completely hiding the additional display information (time) 236, but also to make letter information about time easier to view in the screen 232 or to fit the design of letter information about time to preferences of the user.

Changes of position information and size information of the screen displayed OSD made by the information display unit 506 have been described with reference to FIG. 5 to FIG. 21. After the information display unit 506 makes changes of position information and size information of the screen displayed OSD, the information display unit 506 sends the position information and size information of the screen displayed OSD to the display position recording unit 508.

The display position recording unit 508 can record position information and size information of the screen displayed OSD in the storage unit 512. For example, when the user changes the channel later or turns on the image display apparatus 500, the storage unit 512 sends stored position information and size information of the screen displayed OSD to the display position recording unit 508. As a result, the display position recording unit 508 sends the stored position information and size information of the screen displayed OSD to the information display unit 506.

The information display unit 506 can move the screen displayed OSD without any need for a user's operation or the like based on the acquired and stored position information and size information of the screen displayed OSD. As described above, the image display apparatus 500 eliminates the need for the user to adjust the position or size of the screen displayed OSD each time the channel is set by storing position information and size information of the screen displayed OSD in the storage unit 512. As a result, the user can view images in a screen in which additional display information is hidden by the screen displayed OSD without doing any complicated work.

[Display Settings of the Screen Displayed OSD by a User's Operation]

Next, the method of setting the display of the screen displayed OSD will be described with reference to FIG. 22 and FIG. 23.

First, a case in which the information display unit 506 can move the screen displayed OSD or change the size thereof by a user's operation will be described with reference to FIG. 22. A user's operation refers to an operation performed by the user based on the selection of an icon in the screen.

The user can select, for example, an icon key of "Move screen display (clock)" from various icons by moving the cursor up and down using the up/down/right/left key 1060 in the remote controller 1000 as shown in FIG. 2 and pressing the decision key 1062. As a result, the user can instruct the information display unit 506 to move the screen displayed OSD (clock) 240. That is, the user can instruct the information display unit 506 to move the screen displayed OSD (clock) 240 by using the remote controller 1000 shown in FIG. 2.

In the remote controller shown in FIG. 2, the user can use the up/down/right/left key 1060 for movement in the X and Y directions in the screen. For a size change, for example, the user can press the volume up key 1020 to extend the screen displayed OSD in the X direction. The user can also shrink the screen displayed OSD in the X direction by pressing the volume down key 1022. If the user can extend the screen displayed OSD in the Y direction by pressing the channel +key 1052. The user can also shrink the screen displayed OSD in the Y direction by pressing the channel –key 1054.

After the information display unit 506 moves the screen displayed OSD based on user's operations described above, the user can cause the storage unit 512 to store information about the position, shape, and size of the screen displayed OSD via the display position recording unit 508.

[Display Settings of the Screen Displayed OSD Using a Database]

An example is shown in which there is no need for the operation to move the screen displayed OSD by the user as described above. That is, a case in which the information display unit 506 can move the screen displayed OSD or change the size thereof using a database will be described with reference to FIG. 23. The database refers to a file of data concerning, for example, the optimal position, shape, and size in the screen for each channel of the screen displayed OSD. The use of a database refers to the use of, for example, information for each channel as shown in FIG. 20 held by the image display apparatus 500 in advance.

The user can select, for example, an icon key of "TV Asazuki" from various icons by moving the cursor up and down using the up/down/right/left key 1060 in the remote controller as shown in FIG. 2 and pressing the decision key 1062. As a result, the information display unit 506 performs movement or size change of the screen displayed OSD (clock) or screen displayed OSD (channel) as shown in FIG. 12 or the like without any operation performed by the user. The user can select an icon of a necessary channel by moving the cursor up and down using the up/down/right/left key 1060 in the remote controller and pressing the decision key 1062. As a result, the information display unit 506 can move the screen displayed OSD or change the size thereof based on a database held by the image display apparatus 500. Moreover, settings may be made to enable the information display unit 506 to execute other functions. For example, a database may be set so that the information display unit 506 can change the shape of the screen displayed OSD in various ways.

The use of a database is not limited to a case in which a data file corresponding to each channel is held by the image display apparatus 500. For example, the image display apparatus 500 may have a data file corresponding to each specific time of each channel as a database. Also, for example, the image display apparatus 500 may have a data file corresponding to each specific program of each channel as a database.

SUMMARY

Lastly, the function configuration held by an image display apparatus in the present embodiment and operation effects obtained from the function configuration will be briefly summarized.

First, the function configuration of an image display apparatus according to the present embodiment can be represented as follows. The image display apparatus has an image receiving unit, image display unit, and information display unit.

The image receiving unit is used to receive an image signal on which additional display information is superimposed. Thus, an image signal received by the image display apparatus has additional display information superimposed thereon. The additional display information is superimposed by, for example, a broadcasting station that delivers the image signal. The additional display information includes, for example, channel information and title information of programs, logos of broadcasting stations, and time information.

The image display unit is used to display an image signal on which the additional display information is superimposed in a screen. Thus, the image display apparatus can display an image signal and additional display information by the image display unit. However, the additional display information frequently has a function to display such additional image display information. Thus, additional information superimposed on an image signal and information displayed by a function of the image display apparatus may be duplicately displayed. Therefore, the image display apparatus displays predetermined display information at display positions of the additional display information so that the additional display information displayed in the screen is hidden. As a result, the additional display information is not duplicately displayed, which reduces complicatedness of the screen display.

The function configuration of an image display apparatus according to the present embodiment can be represented also as follows. The image display apparatus has an image receiving unit, image display unit, information display unit, and further a display position recording unit.

The display position recording unit is used to record display position information indicating the display position of the additional display information for each channel. When the display position information is recorded by the display position recording unit, the information display unit can display predetermined display information based on the display position information. It is necessary to perform a predetermined operation so that the information display unit displays predetermined display information at display positions of the additional display information to make the additional display information displayed in the screen hidden. However, the information display unit can display the predetermined display information based on the display position information. Thus, there is no need to perform a predetermined operation to expressly display predetermined display information at display positions of additional display information each time an image signal is displayed in the screen. As a result, there is no need for the user to repeat work performed once when the channel is set or the image display apparatus is turned on to view image signals, resulting in a reduction of complicatedness of the screen display.

The screen displayed OSD in the present embodiment is an example of the predetermined display information. The user's operation and the use of a database in the present embodiment are examples of the predetermined operation.

Further, in the present embodiment, the information display unit can adjust the display size of the predetermined display information so that additional display information displayed in the screen is hidden. The display position recording unit can record display size information indicating the display size of the predetermined display information together with the display position information. If the display position information and the display size information are recorded by the display position recording unit, the information display unit can display the predetermined display information based on the display position information and the display size information. Thus, if the size of the predetermined display information displayed by the information display unit is smaller than that of, for example, additional display information, the additional display information can be hidden by adjusting the display size thereof.

The function configuration of an image display apparatus according to the present embodiment can be represented also as follows. The image display apparatus has an image receiving unit, image display unit, information display unit, a display position recording unit, and further a display position detection unit.

The information display unit can display predetermined display information at display positions detected by the display position detection unit so that additional display information displayed in the screen is hidden. Thus, for example, when the user changes the channel, there is no need to expressly operate a remote controller to move predetermined display information so that additional display information is hidden.

The information display unit can display predetermined display information containing the same content as the additional display information at the display position detected by the display position detection unit. Thus, if, for example, time information of the additional display information is considered, the predetermined display information with which the information display unit hides time information of the additional display information is also time information. As a result, the time information is displayed at the same position or almost at the same position usually displayed in the screen and thus, the user can view a program without finding the displayed screen uncomfortable.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
    an image receiving unit that receives an image signal on which additional display information is superimposed, the additional display information including a first content to be visibly displayed to a user regarding the received image signal;
    an image display unit that visibly displays the image signal and the additional display information in a display screen, the additional display information being displayed such that the first content of the additional display information is visibly displayed to the user at a display position of the display screen; and
    an information display unit that visibly displays predetermined display information having a second content to the user on the display screen, the second content of the predetermined display information being determined to be same content as the first content of the additional display information;
    wherein, the information display unit visibly displays the second content at the same display position of the first content being displayed on the display screen, such that the displayed second content overlies the displayed first content, and, such that the first content and the second content which are determined to be the same content are not visibly displayed in duplicate on the display screen to the user.

2. The image display apparatus according to claim 1, further comprising a display position recording unit that records display position information indicating the display position of the additional display information for each channel, wherein
    if the display position information is recorded by the display position recording unit, the information display unit displays the predetermined display information based on the display position information.

3. The image display apparatus according to claim 2, wherein the information display unit adjusts a display size of the predetermined display information so that the additional display information displayed in the screen is hidden,
    the display position recording unit records display size information indicating the display size of the predetermined display information together with the display position information, and
    if the display position information and the display size information are recorded by the display position recording unit, the information display unit displays the predetermined display information based on the display position information and the display size information.

4. The image display apparatus according to claim 2 or 3, further comprising a display position detection unit that detects the display position of the additional display information displayed in the screen, wherein
    the information display unit displays the predetermined display information at the display position detected by the display position detection unit so that the additional display information displayed in the screen is hidden.

5. The image display apparatus according to claim 1, wherein the image receiving unit receives the image signal on which at least one piece of information of channel information of a program corresponding to the image signal, title information of the program, and time information as the additional display information is superimposed.

6. An image display method comprising the steps of:
    receiving an image signal on which additional display information is superimposed, the additional display information including a first content to be visibly displayed to a user regarding the received image signal;

visibly displaying the image signal and the additional display information in a display screen, the additional information being displayed such that the first content of the additional display information is visibly displayed to the user at a display position of the display screen; and visibly displaying predetermined display information having a second content to the user on the display screen, the second content of the predetermined display information being determined to be same content as the first content of the additional display information;

wherein, the second content is visibly displayed at the same display position of the first content being displayed on the display screen, such that the displayed second content overlies the displayed first content, and, such that the first content and the second content which are determined to be the same content are not visibly displayed in duplicate on the display screen to the user.

* * * * *